US011767942B2

(12) United States Patent
Durieux et al.

(10) Patent No.: US 11,767,942 B2
(45) Date of Patent: Sep. 26, 2023

(54) MALE FLUID CONNECTION ELEMENT AND FLUID CONNECTION COMPRISING SUCH A MALE ELEMENT

(71) Applicant: STAUBLI FAVERGES, Faverges-Seythenex (FR)

(72) Inventors: Christophe Durieux, Gilly sur Isere (FR); Frederic Morel, Lathuile (FR); Florian Mille, Doussard (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 17/873,695

(22) Filed: Jul. 26, 2022

(65) Prior Publication Data
US 2023/0030360 A1 Feb. 2, 2023

(30) Foreign Application Priority Data

Jul. 29, 2021 (FR) ...................................... 2108260

(51) Int. Cl.
*F16L 37/23* (2006.01)
*F16L 37/32* (2006.01)

(52) U.S. Cl.
CPC .............. *F16L 37/23* (2013.01); *F16L 37/32* (2013.01)

(58) Field of Classification Search
CPC . F16L 37/23; F16L 37/22; F16L 37/34; F16L 37/32
See application file for complete search history.

(56) References Cited

U.S. PATENT DOCUMENTS

| 4,289,164 | A | * | 9/1981 | Ekman | F16L 37/23 137/614.03 |
|---|---|---|---|---|---|
| 5,144,979 | A | * | 9/1992 | Shobuzako | F16L 37/23 137/614.04 |
| 5,709,243 | A | * | 1/1998 | Wells | F16L 37/34 137/614.01 |
| 6,511,100 | B1 | * | 1/2003 | Le Clinche | F16L 37/23 403/322.2 |
| 7,661,725 | B2 | * | 2/2010 | Kouda | F16L 37/23 285/318 |

(Continued)

FOREIGN PATENT DOCUMENTS

| CN | 208138665 U | * 11/2018 | .............. F16L 21/08 |
|---|---|---|---|
| CN | 208138665 U |   11/2018 | |

(Continued)

*Primary Examiner* — David Colon-Morales

(57) ABSTRACT

A male element (10) for a fluid connection with a male body (12) including a tubular extension (20) and a crown (22) fixed around the tubular extension and having at least one radial recess opening onto an inner face (44) and onto an outer face of the crown (22). The male element comprises an integral ring (16) mounted around the crown, and for each radial recess, a locking element (14), movable between an inner position and an outer position, the outward movement of which is limited by the ring. Each radial recess is delimited by an inner wall (52) forming part of the crown and extending around a radial central axis of the radial recess. The ring has at least one longitudinal slot, which passes radially through the ring, and comprises a resiliently deformable end portion (112) with at least one inner tooth which is engaged in an outer groove, recessed in the crown.

15 Claims, 21 Drawing Sheets

(56) References Cited

U.S. PATENT DOCUMENTS

| | | | | |
|---|---|---|---|---|
| 8,205,914 B2* | 6/2012 | Chappaz | ............ | F16L 37/32 |
| | | | | 285/276 |
| 8,246,085 B2* | 8/2012 | Kitagawa | ............ | F16L 37/23 |
| | | | | 137/614.04 |
| 9,909,703 B2* | 3/2018 | Van Scyoc | ............ | F16L 37/32 |
| 10,094,502 B2* | 10/2018 | Tiberghien | ............ | F16L 37/23 |
| 10,415,734 B2* | 9/2019 | Imoto | ............ | F16L 37/23 |
| 2009/0121478 A1* | 5/2009 | Tsujita | ............ | F16L 37/23 |
| | | | | 285/316 |

FOREIGN PATENT DOCUMENTS

| | | | | |
|---|---|---|---|---|
| WO | 2021/018759 A1 | 2/2021 | | |
| WO | WO-2021018759 A1 * | 2/2021 | ............ | F16L 37/23 |

\* cited by examiner

MALE FLUID CONNECTION ELEMENT AND FLUID CONNECTION COMPRISING SUCH A MALE ELEMENT

The present invention relates to a male fluid connection element and to a fluid connection comprising such a male element.

The invention relates more particularly to quick-acting fluid connections having a self-locking feature upon coupling between the male and female parts of the fluid connection.

It is known from WO2021/018759 to propose a fluid connection comprising a male connection element, comprising an integral body and a crown. The crown comprises a first part integral with the body and a second part in the form of a ring, mounted around the body and fixed to the first part. The two parts of the crown form a plurality of radial recesses for receiving locking balls, and which comprise outer stops for holding the balls in the radial recesses. In the longitudinal direction of the male element as well as in the circumferential directions, the mounted ring is stressed by the locking balls when the male element is coupled to a female element. In order to withstand the forces exerted by the locking balls, the mounted ring must be made of a metal material and be secured to the first part of the crown, for example by welding, screwing, or crimping. Furthermore, when the ring is crimped onto the first part of the crown, the crimping is not sufficient to block the movement of the ring in relation to the body, and any force on the ring, for example exerted by the locking balls, stresses the crimping.

Mounting the ring on the male body of such a male fluid connection element is therefore complex to achieve. In addition, as the ring is stressed when the fluid connection is coupled, there is a risk of failure of the male connection element.

It is these disadvantages that the invention more particularly intends to remedy, by proposing a male fluid connection element, of which the design of the outer stop for holding the locking balls is simplified, while ensuring the strength and compactness of the male connection element.

To this end, the invention relates to a male fluid connection element comprising:

a male body, centered on a longitudinal axis, defining a forward longitudinal direction and comprising:
  a tubular extension centered on the longitudinal axis, delimiting an inner conduit and having an outer radial face, and
  a crown arranged in a fixed manner around the tubular extension and having at least one radial recess, each radial recess opening onto an inner face and onto an outer face of the crown, the inner face of the crown and the outer radial face of the tubular extension radially delimiting an annular space between them;
an integral ring which is mounted around the crown;
for each radial recess, a locking element of which the radially outward movement into the associated radial recess is limited by an outer stop formed by the ring at a junction between a notch of the ring and an outer face of the ring, each locking element being movable in the radial recess thereof between:
  an inner position, in which the locking element projects from the inner face and the outer face of the crown and does not project from the outer face of the ring, and in which movement of each locking element radially inwardly into the associated radial recess is prevented by an inner stop formed by the male body, and
  an outer position, in which the locking element projects from the outer face of the ring,
wherein, when the ring is mounted on the crown, the male body faces a rear face of the ring in the forward longitudinal direction, and the ring faces the male body or at least one locking element in the forward longitudinal direction, at least when said locking element is in an inner position.

According to the invention:
  each radial recess is delimited by an inner wall forming part of the crown, the inner wall extending around a radial central axis of the radial recess;
  the ring has at least one longitudinal slot which passes radially through the ring and opens onto the rear face of the ring;
  the ring comprises a resiliently deformable end portion delimited by the longitudinal slot and the rear face of the ring; and
  a free end of the end portion comprises at least one inner tooth which, when the ring is mounted on the crown, is engaged in an outer groove, provided in a cavity in the outer face of the crown.

Owing to the invention, the outer stop for the locking elements is formed on a ring mounted on the male body, the mounting of which on the male body equipped with the locking elements is simplified and made more reliable, because the end portion of the ring allows the ring to be fixed to the crown by engagement of the inner tooth in the outer groove, for example by snap-fitting, which advantageously avoids the need for welding or crimping. The inner wall of the radial recess, by extending all around the central radial axis, makes it possible to limit the stresses on the ring by the locking elements and to limit the stresses of fixing the ring to the male body.

According to advantageous but non-mandatory aspects of the invention, such a male element may incorporate one or more of the following features, taken in any technically permissible combination:

The end portion of the ring is able to resiliently deform radially to the longitudinal axis, to allow movement of the inner tooth between a position disengaged from the outer groove and the position engaged in the outer groove.

When the ring is mounted on the crown, in each of the two directions circumferential to the longitudinal axis, the ring is able to abut a transverse face of the crown, in particular a planar and orthoradial transverse bottom face of the outer groove.

When the ring is mounted on the crown, the inner tooth is able to abut a front face of the outer groove in the forward longitudinal direction.

The ring comprises an annular distal portion forming a front end of the ring, each end portion of the ring extends from the annular distal portion and is circumferentially delimited by two adjacent longitudinal slots, and the free end forming each inner tooth is a rear free end of the end portion.

The front face of the outer groove is arranged, along the longitudinal axis, at the same level as each radial recess.

A rear face of each inner tooth intersects the rear face of the ring and converges toward the longitudinal axis in the forward longitudinal direction and the front face of each outer groove extends perpendicular to the longitudinal axis.

Each longitudinal slot of the ring forms a notch with an outer stop.

The outer groove is angularly offset from each radial recess of the crown, around the longitudinal axis.

The inner wall of each radial recess intersects, along the entire contour thereof, with a surface of constant diameter forming the outer face of the crown.

For each locking element, the outer stop is distributed around the radial central axis of the radial recess associated with said locking element.

The locking element is a locking ball, and a radial thickness between the outer face of the crown and the outer face of the ring, measured at the radial recess, is strictly smaller than a radius of the locking ball.

A portion of the male body delimits a front face which is arranged opposite, in the forward longitudinal direction, the rear face of the ring and which extends beyond the crown outwardly in a direction radial to the longitudinal axis, and the portion of the male body is integral with the tubular extension and with the crown.

The ring is made of a polymeric plastics material.

The invention also relates to a fluid connection, comprising a male element and a female element, the female element comprising a female body having an outer annular groove therein, and a locking sleeve which has a locking face and which is movable relative to the female body along a longitudinal axis of the female body, between a locked position, in which the locking face is radially aligned with the outer annular groove, and an unlocked position, in which the locking face is offset from the outer annular groove along the longitudinal axis of the female body. According to the invention, the male element is as mentioned above. Furthermore, when the locking sleeve is in the unlocked position, each locking element is free to move to an outer position within the radial recess. Furthermore, when the male element is coupled with the female element, the locking sleeve is in the locked position, surrounds the ring, and radially overlaps the notch to hold the locking element within the outer annular groove of the female body, with the female body being engaged within the annular space.

This fluid connection has the same advantages as the male element of the invention.

The invention will be better understood and further advantages thereof will become clearer in the light of the following description of five embodiments of a male fluid connection element and a fluid connection in accordance with the principle thereof, given by way of example only and made with reference to the drawings, wherein.

Figure 1:
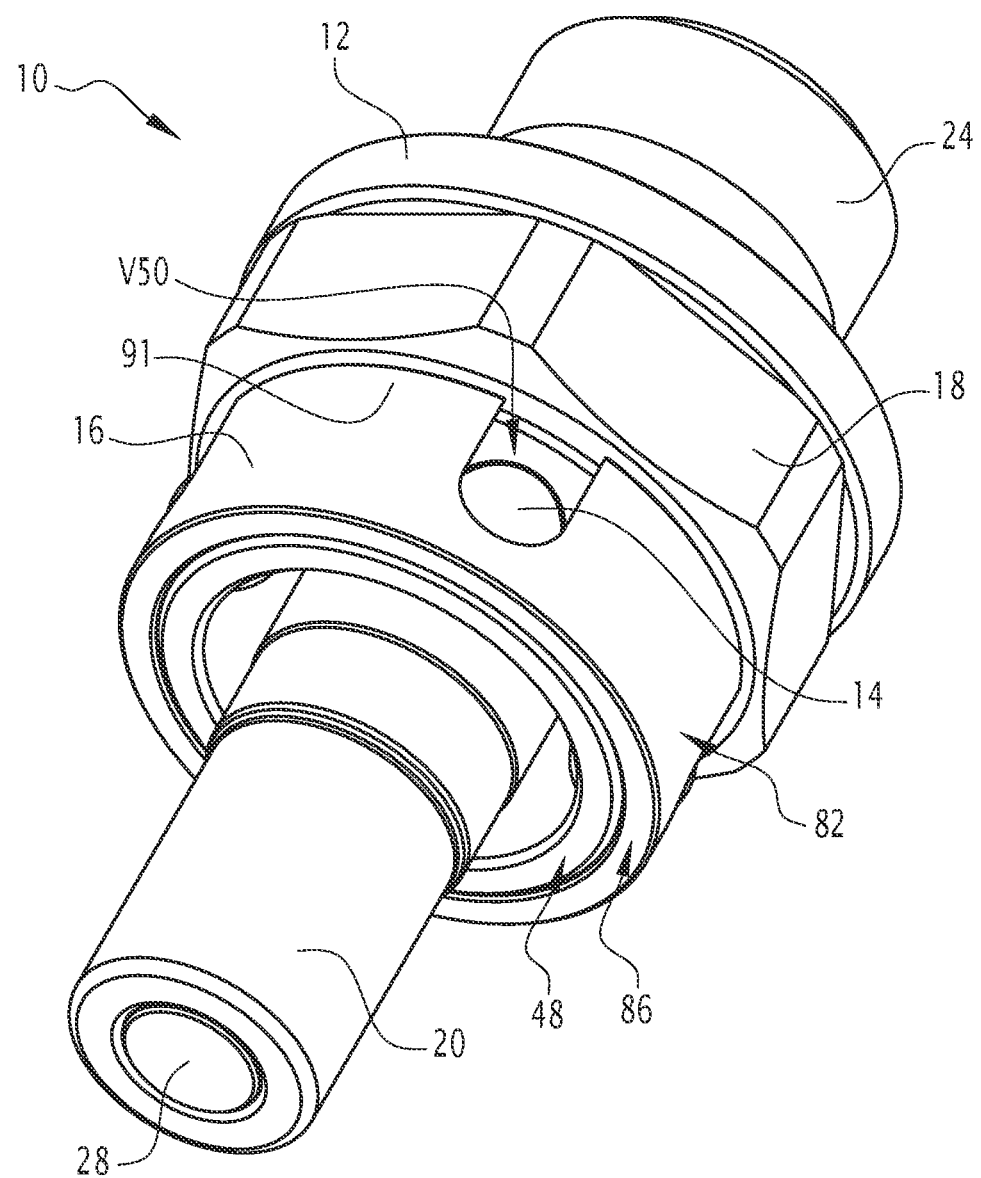
FIG. 1 is a perspective view of a male fluid connection element according to a first embodiment of the invention.

In the following description, a longitudinal axis of a connecting element, or of a portion of a connecting element, is defined as a principal axis of said element, generally corresponding to an axis along which said element extends. The longitudinal axis of an element is thus the central axis of said element.

When a male fluid connection element and a female fluid connection element are coupled, the respective longitudinal axes thereof coincide. Thus, the longitudinal axis of a connection element forms a coupling axis of said connection element. A male element and a female element are coupled by a movement of said elements toward each other along the longitudinal axes thereof.

A radial direction is defined as a direction which is orthogonal to and intersects with, i.e., is perpendicular to, a longitudinal axis. A radial face is a face that extends around the longitudinal axis. For a given element, the term "inner" means "facing the longitudinal axis, along the radial direction of said element," while the term "outer" means "facing away from the central longitudinal axis, along the radial direction of said element."

An orthoradial direction is defined as a direction which is orthogonal to a longitudinal axis and to a radial direction and does not intersect with the longitudinal axis.

An orthoradial face is defined as a face that is parallel to a longitudinal axis, does not comprise said longitudinal axis, and is perpendicular to a radial direction.

A direction circumferential to a longitudinal axis is defined as a circular direction around the longitudinal axis and centered on the longitudinal axis. In other words, when an element is rotating about a longitudinal axis, a moving point of said element moves in a circumferential direction. Thus, there are two directions circumferential to a longitudinal axis, corresponding to the two directions of rotation about said longitudinal axis.

The front, or distal, side of a male fluid connection element or part of a male element, respectively of a female fluid connection element or part of a female element, is also defined as the side of said male element, respectively of said female element, oriented along the longitudinal axis of said element in the coupling direction, i.e., oriented toward the female element, respectively toward the male element, when a male element and a female element begin to couple, before the male and female elements are brought together. Conversely, the rear, or proximal, side of a male element, respectively of a female element, is defined as the side of said element oriented along the longitudinal axis of said element opposite to the coupling direction, i.e., opposite to the female element, respectively opposite to the male element.

A forward longitudinal direction of an element is defined as a direction parallel to the longitudinal axis of said element and directed toward the front of said element.

A rearward longitudinal direction of an element is defined as a direction parallel to the longitudinal axis of said element and directed toward the rear of said element.

FIGS. 1 to 6 show a male fluid connection element 10 according to a first embodiment of the invention.

The male element 10 is designed to be coupled with a complementary female element 200, so as to form a fluid connection 250 forming part of, for example, a cooling circuit.

The male element 10 comprises a male body 12, locking elements 14, and a ring 16. In the example, the male element 10 comprises four locking elements 14. Furthermore, in the example, the locking elements 14 are locking balls. Alternatively, a different number of locking elements may be provided, for example a single locking element.

In FIG. 1, the ring 16 and locking balls 14 are shown mounted on the male body 12.

Figure 2:
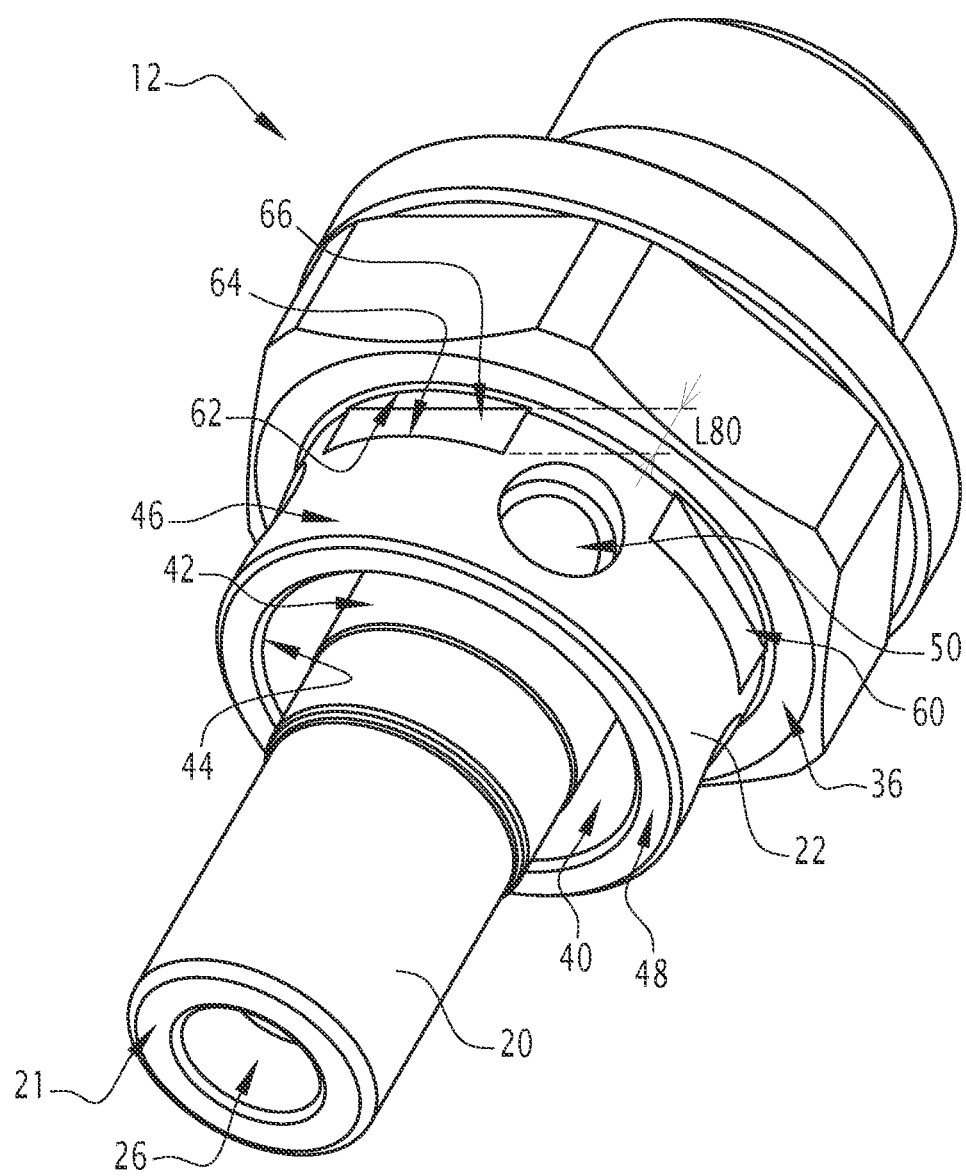
FIG. 2 is a perspective view of a portion of the male element of FIG. 1, from the same angle.

In FIG. 2, only the male body 12 is shown.

Figure 3:
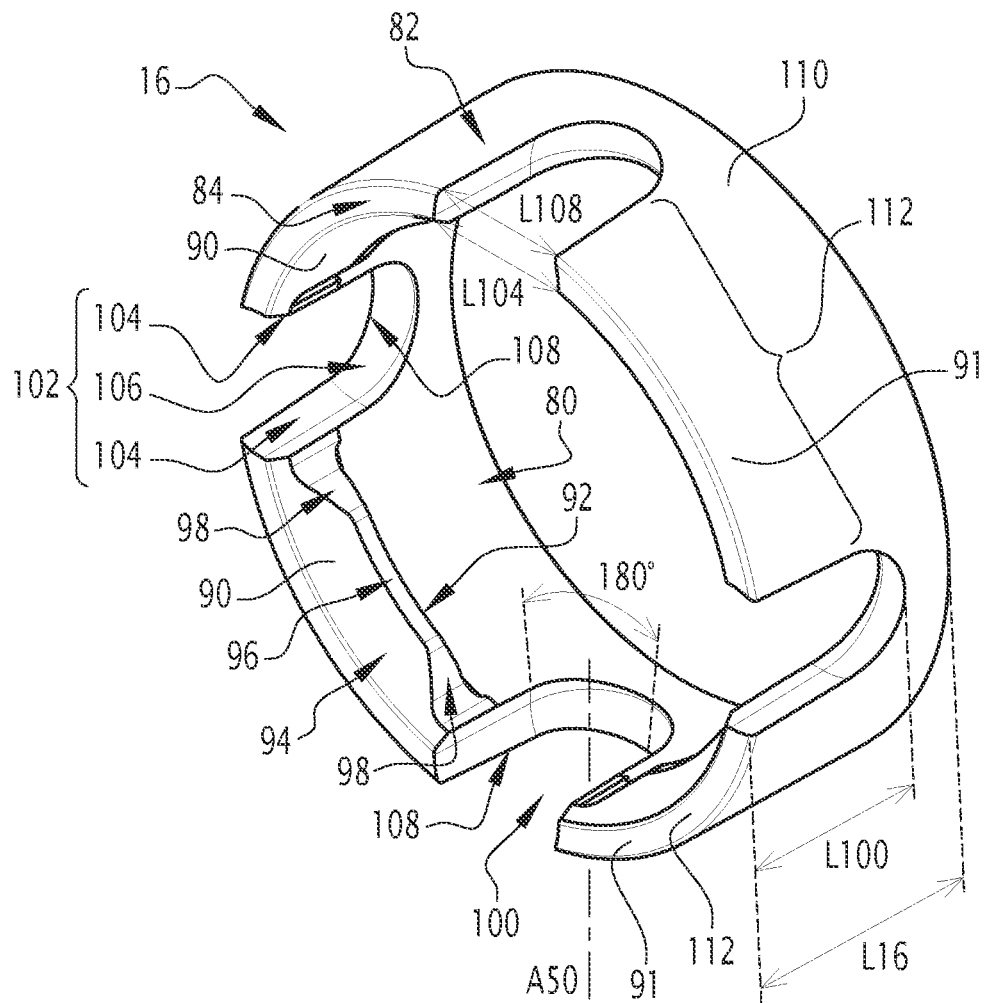
FIG. 3 is a perspective view of another portion of the male element of FIG. 1, from another viewing angle.

In FIG. 3, only the ring 16 is shown.

The male body 12 comprises a central portion 18, a tubular extension 20, a crown 22, and a rear portion 24, which are integral, i.e., formed by a single, contiguous piece. In an alternative embodiment (not shown), the male body 12 is composed of a central portion 18, a tubular extension 20, a crown 22, and a rear portion 24, which are a plurality of parts fixed together, for example by welding. The crown 22 is thus fixed with respect to the tubular extension 20. The tubular extension 20 and the crown 22 extend from the central portion 18 and form a front portion of the male body 12. Preferably, the integral portion of the male body 12, i.e., the central portion 18, the tubular extension 20, the crown 22, and the rear portion 24, are made of metal, such as aluminum or brass.

The tubular extension 20 and the crown 22 are arranged at the distal side of the male body 12 and the rear portion 24 is arranged at the proximal side of the male body.

The distal end of the tubular extension 20 is denoted "21," which corresponds to the forwardmost portion of the male element 10.

Advantageously, the outside of the rear portion 24 comprises a thread 25, such that it can be attached to a pipe (not shown). In practice, the thread 25 is comprised by a cylindrical portion of the rear portion 24. The thread 25 is shown only in FIG. 4.

The outside diameter of the thread 25, measured in a radial direction of the male body 12, is denoted "D25."

Figure 4:
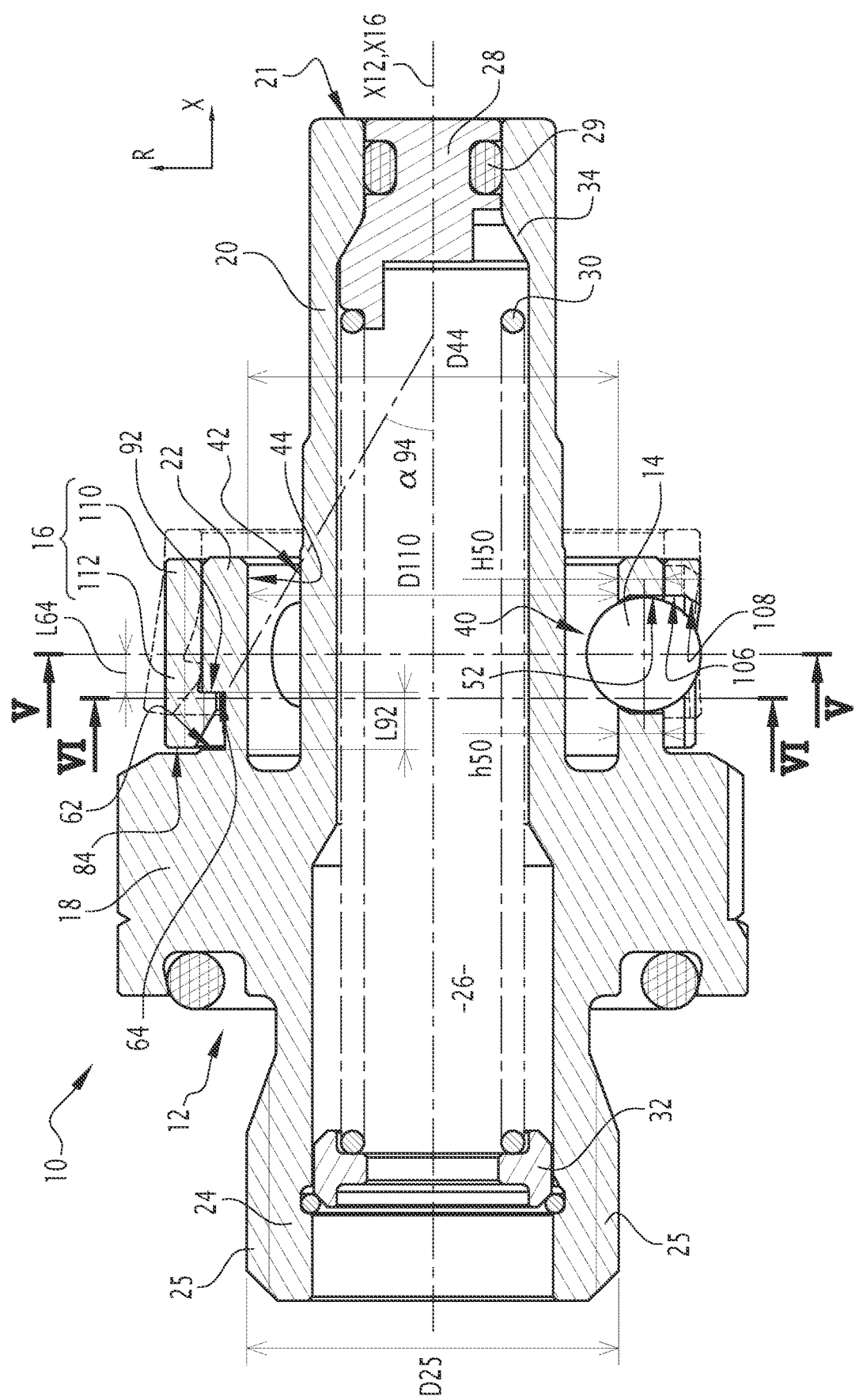
FIG. 4 is a cross section of the male element of FIG. 1.

As best seen in FIG. 4, the male body 12 is hollow and delimits an inner through-conduit 26. The inner conduit 26 opens out at the center of the rear portion 24 on the one hand and at the center of the tubular extension 20 on the other hand.

A longitudinal axis X12 of the male body 12 is defined as an axis along which the inner conduit 26 and the tubular extension 20 extend. Generally, the male body 12 extends along the longitudinal axis X12.

Generally, in the following description, and unless otherwise stated, the terms "axial," "radial," "orthoradial," and "circumferential" refer to the longitudinal axis X12.

The forward longitudinal direction of the male body 12 is shown only in FIG. 4 by an arrow marked "X."

A direction radial to the longitudinal axis X12 of the male body 12 is shown only in FIG. 4 by an arrow denoted "R."

Figure 5:
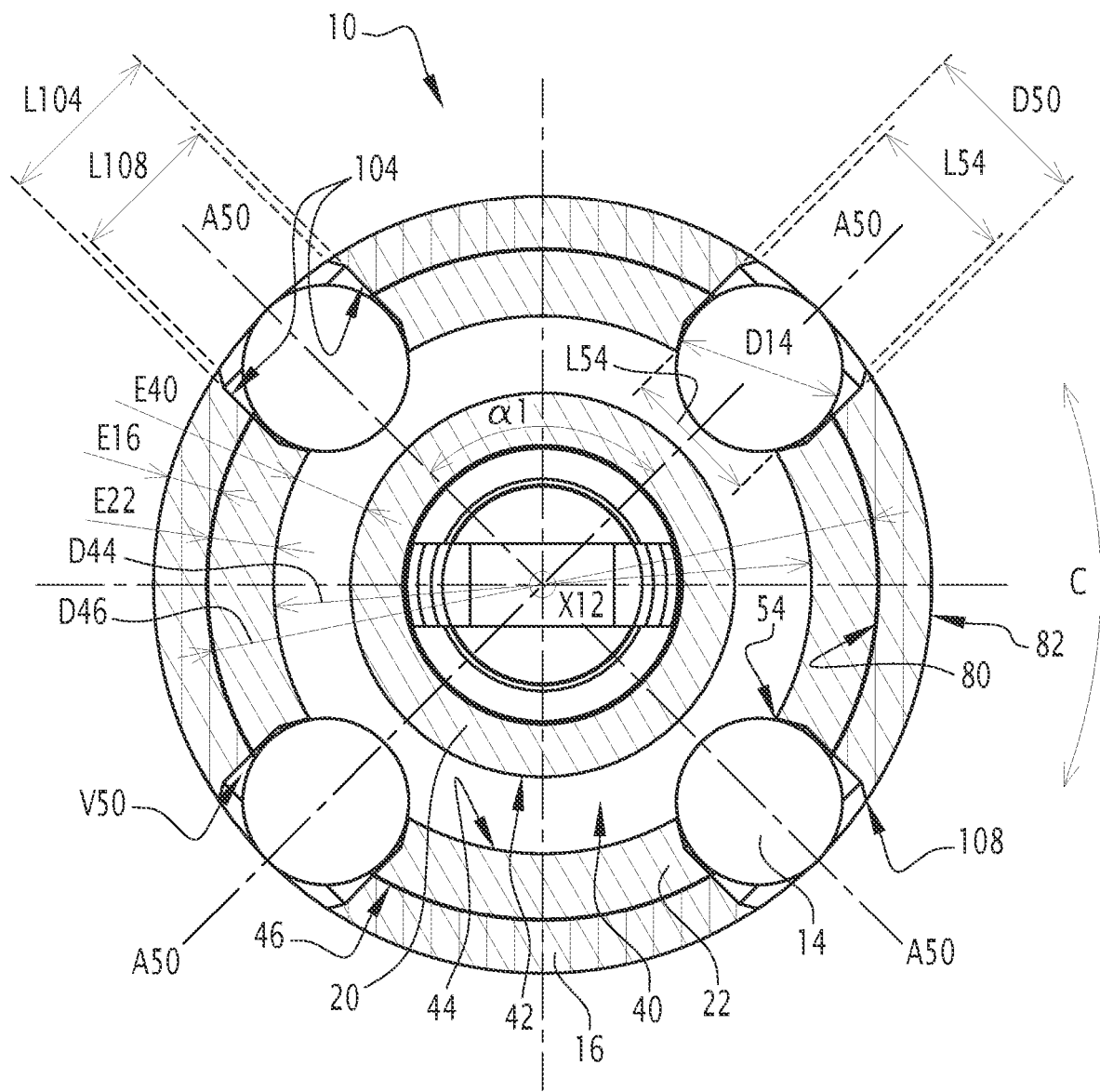
FIG. 5 is a cross section of the male element of FIGS. 1 and 4, along the sectional plane V of FIG. 4.

The two directions circumferential to the longitudinal axis X12 of the male body 12 are shown only in FIG. 5 by a double arrow denoted "C."

The male element 10 also comprises a valve 28, which housed in the distal end of the inner conduit 26, i.e., housed in the tubular extension 20, and is movable in the male body 12 along the longitudinal axis X12 between an advanced position for sealing the inner conduit 26 and a retracted position for opening the inner conduit. In FIG. 2, the valve 28 is not shown.

The valve 28 comprises a seal 29, in radial contact with the tubular extension 20 when the valve is in the position for sealing the inner conduit 26, so as to ensure the sealing of the inner conduit 26 by the valve.

The male body 12 comprises a valve spring 30, which exerts a force on the valve 28, relative to the integral portion of the male body and along the longitudinal axis X12, tending to push the valve toward the advanced sealed position thereof.

The valve spring 30 thus extends along the longitudinal axis X12. The distal end of the valve spring abuts the valve 28 and the proximal end of the valve spring abuts a stop ring 32, the stop ring 32 being held within the integral portion of the male body.

The male body 12 also comprises a stop 34, which extends into the inner conduit 26 and prevents movement of the valve 28 in the forward longitudinal direction X beyond the sealed position thereof.

Both the tubular extension 20 and the crown 22 extend from the central portion 18 toward the distal end of the male body 12 along the longitudinal axis X12. In practice, the crown 22 extends from a front face 36 of the central portion 18 of the male body 12. The front face 36 is planar and axial, i.e., it is perpendicular to the longitudinal axis X12. Furthermore, along a radial direction of the male body 12, the front face 36 extends beyond the crown 22 to the outside. In other words, in FIG. 2, the front face 36 is visible and extends all around the crown 22.

Furthermore, the crown 22 is located at a distance from the tubular extension 20, along a radial direction of the male body 12, being further from the longitudinal axis than the tubular extension. Thus, the male body 12 comprises an annular space 40, provided between the tubular extension 20 and the crown 22, which forms a counterbore. The crown is thus located around the tubular extension.

The annular space 40, or counterbore, is thus formed between an outer radial face 42 of the tubular extension 20, i.e., an outer face of the tubular extension, and an inner radial face 44 of the crown 22, i.e., an inner face of the crown.

The outer radial face 42 of the tubular extension 20 and the inner radial face 44 of the crown 22 are defined by straight cylinders each having a constant diameter and each being centered on the longitudinal axis X12.

Furthermore, in a radial direction, the crown 22 is delimited by an outer radial face 46, which is also defined by a straight cylinder of constant diameter D46 centered on the longitudinal axis X12. Thus, the diameter D46 of the outer radial face 46 is constant.

Along the longitudinal axis X12, the crown 22 is delimited at the distal end thereof by a front face 48, parallel to the axial face 36 of the central portion 18.

The radial thickness of the crown 22, denoted "E22," i.e., the distance between the inner face 44 and the outer face 46 of the crown, measured along an axis radial in relation to the longitudinal axis X12, is constant, from the axial face 36 of the central portion 18 to the front face 48 of the crown.

The diameter of the inner radial face 44, measured in a radial direction of the male body 12, is denoted "D44."

Advantageously, the diameter D44 of the inner radial face 44 is substantially equal to the diameter D25 of the thread 25. "Substantially equal" means that the diameter D44 is equal to the diameter D25 plus or minus 10%.

The crown 22 is formed with radial recesses 50 for receiving the locking balls 14. In the example, the male element 10 comprising four locking balls 14, the crown 22 is formed with four radial recesses 50.

Figure 6:
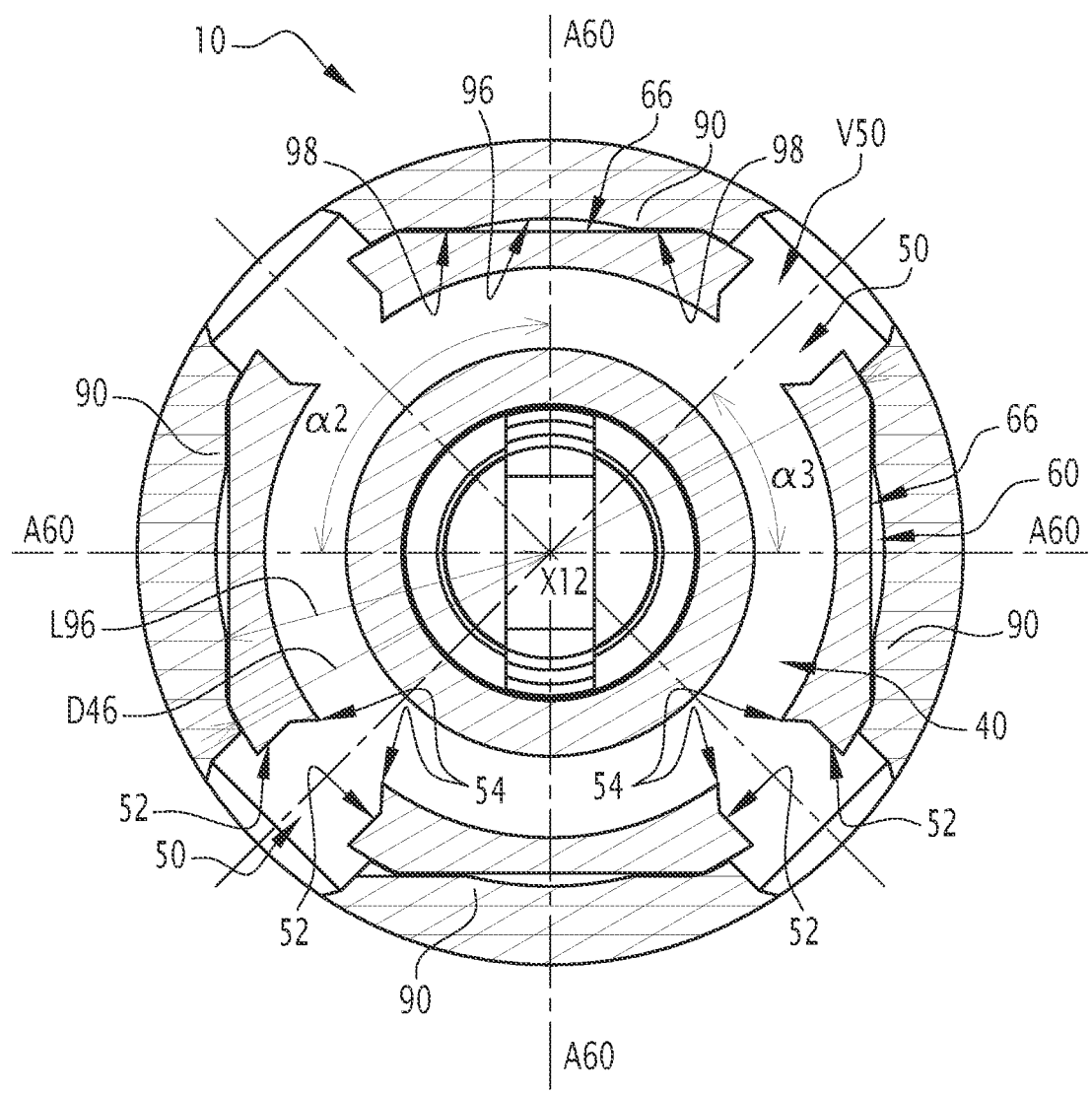
FIG. 6 is a cross section of the male element of FIGS. 1 and 4, along the sectional plane VI of FIG. 4.

The radial recesses 50 are best seen in FIGS. 5 and 6.

Each radial recess 50 extends through the crown 22, from the inner face 44 to the outer face 46 thereof.

Each radial recess 50 is delimited by a cylindrical inner wall 52 centered on a radial central axis A50, and by an inner stop 54 formed at the junction of the radial recess and the inner face 44 of the crown 22. Thus, the inner wall 52 of each radial recess intersects, along the entire contour thereof, with the surface of constant diameter D46 forming the outer face 46 of the crown.

Furthermore, the inner wall 52 of the crown 22 forming a radial recess 50 extends all around the radial central axis A50 of said radial recess. In other words, the inner wall 52 of the crown 22 is a closed wall. In particular, the intersection between a radial recess and the inner face 44 of the crown 22 has a closed contour arranged all around the radial central axis A50 of said radial recess.

The diameter of each radial recess 50, measured perpendicular to the radial axis A50 of that housing, is denoted "D50," wherein the diameter D50 corresponds to the diameter of the cylindrical inner wall 52.

The inner stop 54 of a radial recess 50 extends from the cylindrical inner wall 52 of that radial recess into the interior of the radial recess, i.e., at the inner stop 54, the radial recess is partially closed. The minimum width of a notch 100, measured at the inner stop 54, is denoted "L54," the minimum width L54 being measured perpendicular to the axis A50. The width L54 is therefore less than the diameter D50, as best seen in FIG. 5.

The diameter of a locking ball 14 is denoted "D14" and the radius thereof is denoted "R14." Advantageously, the diameter D14 is between the width L54 and the diameter D50. Thus, when a locking ball is arranged in a radial recess 50, said locking ball is held in the radial recess 50 by the inner stop 54, which limits the movement thereof toward the annular space 40.

In cross section in a plane passing through the radial axis A50 of each radial recess 50 and through the longitudinal axis X12, the distal radial height of a radial recess 50, denoted "H50," is equal to the proximal radial height thereof, denoted "h50." In other words, the distance between the inner face 44 and the outer face 46 of the crown 22, measured in a radial direction, is equal on either side of the radial recesses 50, along the longitudinal axis X12.

In an orthoradial direction, the radial recesses 50 are evenly distributed on the crown 22, i.e., the angle formed between two radial central axes A50 of two adjacent radial recesses, denoted "α1," is constant. In the example, the crown comprising four radial recesses, the angle α1 between two adjacent radial central axes A50 is equal to 90°.

The crown 22 comprises outer grooves 60, in the example four outer grooves, recessed from the outer face 46 of the crown, in particular from the cylindrical surface of diameter D46, and each extending in an orthoradial direction. Thus, each outer groove 60 does not open onto a surface of the crown 22 facing in the forward longitudinal direction X. In particular, each outer groove 60 does not open onto the front face 48 of the crown. In particular, each outer groove 60 opens out of the crown 22 only in the orthoradial direction. Along the longitudinal axis X12, the four outer grooves 60 are arranged at the same level. The two circumferential ends of each outer groove 60 are arranged at the same level along the longitudinal axis X12.

Each outer groove 60 comprises a rear face 62 and a front face 64 that are planar and axial, i.e., they are perpendicular to the longitudinal axis X12. The rear face 62 and front face 64 are thus parallel to each other and parallel to the axial face 36 of the central portion 18. The axial rear face 62 is oriented in the forward longitudinal direction X while the axial front face 64 is oriented opposite the forward longitudinal direction X. The axial front face 64 extends across the entire width of the outer groove 60, taken along the orthoradial direction of the outer groove 60.

Along the longitudinal axis X12, the rear face 62 is arranged longitudinally behind the radial recesses 50 and the front face 64 is arranged longitudinally at the radial recesses, while being arranged behind the radial axis A50 of the radial recesses. Along the longitudinal axis X12, each outer groove 60 thus extends at least partially at a longitudinal level occupied by the radial recesses 50.

Measured along the longitudinal axis X12, the longitudinal length between the axial front face 64 of the grooves 60 and the central radial axis A50 of the radial recesses 50, denoted "L64," is therefore less than the radius of the radial recesses, i.e., half the diameter D50. Preferably, the length L64 is greater than 0.5 times the radius of the radial recesses, more preferably greater than 0.75 times the radius of the radial recesses.

Each outer groove 60 comprises a transverse bottom face 66. The transverse bottom face 66 of each outer groove is a planar face orthoradial to the longitudinal axis X12. Thus, the transverse bottom face 66 is perpendicular to the rear face 62 and front face 64.

For each groove 60, a central radial axis A60 is defined as an axis radial to the longitudinal axis X12 and passing through the center of the transverse bottom face 66 of the groove, i.e., passing through the point on the transverse bottom face 66 nearest the longitudinal axis X12. The transverse bottom face 66 of a groove 60 is thus perpendicular to the central radial axis A60 of said groove.

As best seen in FIG. 6, in a plane perpendicular to the longitudinal axis X12 and parallel to the radial central axes A50, the outer grooves 60 are evenly distributed on the crown 22 around the axis X12, i.e., the angle formed between two radial central axes A60 of two adjacent outer grooves 60, denoted "α2," is constant. In the example, the crown comprising four radial recesses, the angle α2 between two adjacent radial central axes A60 is equal to 90°.

Furthermore, each of the outer grooves 60 is angularly offset from the radial recesses 50 about the axis X12, i.e., the angular amplitude of each outer groove 60 about the axis X12 does not overlap the angular amplitude occupied by each radial recess 50 about the axis X12. In particular, the angle formed between the radial central axis A60 of an outer groove 60 and the radial central axis A50 of an adjacent radial recess 50, denoted "α3," is non-zero. In the example, the outer grooves 60 are evenly distributed between the radial recesses 60, and the angle α3 is thus equal to 45°. In other words, each outer groove 60 is arranged at an equal distance from two radial recesses 50, in an orthogonal direction.

The ring 16 is integral. The ring is mounted around the crown 22 of the male body 12 and around the locking balls 14.

Advantageously, the ring 16 is made of a polymeric plastics material, such as, for example, a material of the polyacetal family. Preferably, the ring 16 is made by injection molding.

Advantageously, the ring is made of a colored material, the color of which corresponds to a color marking borne by a female connection element.

The ring 16 comprises an inner face 80, an outer face 82, a rear face 84, and a front face 86. The front face 86 is formed on the front end of the ring 16. The rear face 84 is formed on the rear end of the ring 16.

When the ring 16 is mounted around the crown 22, the inner face 80 and outer face 82 are defined by straight cylinders of constant diameter, i.e., they are parallel to each other and extend along a longitudinal axis X16 of the ring 16. Thus, the radial thickness of the ring 16, denoted "E16," i.e., the distance between the inner face 80 and the outer face 82, measured along an axis radial to the longitudinal axis X16, is constant. In particular, when the ring 16 is mounted around the crown 22, the outer face 82 has a constant outer diameter along the entire length L16 of the ring 16.

The rear face 84 and front face 86 are axial, i.e., they are perpendicular to the longitudinal axis X16. Thus, the rear face and front face are parallel to each other.

When the ring 16 is mounted around the crown 22, the longitudinal axes X12 and X16 coincide and the inner face 80 of the ring is arranged around the outer face 46 of the crown. The ring 16 and the crown 22 are arranged such that a reduced radial clearance is present between the inner face of the ring and the outer face of the crown. In other words, the inner face of the ring and the outer face of the crown cooperate, while allowing operating clearance.

When the ring 16 is mounted on the male body 12, the rear face 84 faces the male body 12 along the longitudinal axis X12. More precisely, the rear face 84 faces the front face 36 of the central portion 18 of the male body. In one variant (not shown), the rear face 84 faces the rear face 62 of each outer groove 60.

The ring 16 comprises inner teeth 90, in the example four inner teeth 90. Each inner tooth extends from the inner face 80 of the ring in the direction of the longitudinal axis X16, being located at the rear face 84 of the ring. In other words, each inner tooth 90 is comprised by a rear free end 91 of the ring 16.

Each inner tooth 90 defines a front face 92, a rear face 94, and an inner face 96.

The front face 92 of each tooth 90 is planar, and advantageously orthogonal to the longitudinal axis X16.

The rear face 94 of each tooth 90 is planar, facing away from the forward longitudinal direction X and advantageously inclined with respect to the longitudinal angle X16 by an angle α94. Preferably, the angle α94 is between 15° and 45°, preferably equal to 30°, when the ring 16 is mounted, and converges toward the axis X12 along the forward longitudinal direction X. In other words, each rear face 94 converges toward the longitudinal axis X12 along the forward longitudinal direction X. Thus, the rear faces 94 are flared toward the rear of the ring 16. The rear face 94 of each inner tooth 90 intersects with the rear face 84 of the ring 16.

The inner face 96 of each tooth 90 comprises two face portions 98. The two face portions 98 are coplanar and orthoradial to the longitudinal axis X16, in particular perpendicular to the axis A60 of the outer groove 60 in question.

Advantageously, the minimum length between the longitudinal axis X16 and the inner face 96 of each inner tooth 90, denoted "L96" and measured along an axis radial to the longitudinal axis X16, is less than the radius of the outer face 46 of the crown 22, i.e., less than half the diameter D46.

The length between the front face 92 of an inner tooth 90 and the rear face 84 of the ring 16, denoted "L92," is less than the length of the outer grooves 80 in the crown 22, denoted "L80," the lengths being measured along the longitudinal axes X12 and X16.

When the ring 16 is mounted, the inner teeth 90 are engaged in the outer grooves 60.

Notches 100 are recessed in the ring 16. In the example, the ring comprises four notches. The notches 100 are also referred to as "slots."

In the first embodiment, the notches 100 take the form of longitudinal slots which, along the longitudinal axis X16, open onto the rear face 84 of the ring 16 and do not open onto the front face 86 of the ring and which pass radially through the ring from the inner face 80 to the outer face 82. Thus, the notches 100 pass radially through, in particular at the rear face 84 of the ring.

The notches 100 and the rear face 84 of the ring delimit the rear free ends 91 of the ring.

Preferably, the notches extend from the rear face 84, along the longitudinal axis X16, over a maximum length L100 of between 65% and 90% of the length L16 of the ring 16, more preferably over 80% of the length of the ring.

The notches 100 are delimited by an inner wall 102 of the ring 16. The inner wall 102 of a notch comprises two planar faces 104, which are parallel to each other, and a curved face 106 in the form of a portion of a cylinder which connects the two planar faces 104.

The planar faces 104 intersect with the rear face 84 of the ring.

The curved face 106 forms the bottom of the notch 100, i.e., the curved face is located at the front end of the notch.

The inner wall 102 of a notch 100 is symmetrical about a radial midplane parallel to the planar faces 104 and passing through the center of the curved face 106.

Each notch 100 comprises an outer stop 108, formed at the junction of the inner wall 102 of the notch with the outer face 82 of the ring 16. Thus, the outer stop 108 of a notch extends around the entire contour of the notch, in particular at the junction of the curved face 106 of the inner wall 102 with the outer face 82 of the ring 16.

When the ring 16 is mounted on the male body 12 around the crown 22, the notches 100 of the ring are aligned with the radial recesses 50 of the crown, along a direction orthoradial to the longitudinal axes X12 and X16. Each notch 100 is therefore associated with a radial recess 50. In other words, each notch is partially arranged in radial alignment with a radial recess. Furthermore, the curved face 106 of the notches is advantageously aligned with the cylindrical inner wall 52 of the radial recesses, as best seen in FIGS. 4 and 5. In other words, the curved face 106 of each notch is centered on a radial axis A50 and extends 180° around the radial axis A50. Thus, the outer stop 108 of a notch 100 is spread over 180° around the radial axis A50 of said radial recess. The outer stop 108 then extends on either side of a plane passing through the longitudinal axis X12 and through the radial axis A50 of said radial recess. The outer stop 108 of a notch 100 thus corresponds to an angular sector of 180°. In FIG. 3, in which only the ring 16 is shown, the position that a radial axis A50 would take when the ring is mounted on the crown 22 is shown, by way of illustration. Thus, the outer stop 108 of each notch projects from the inner wall 102 of the notch toward the radial central axis A50 of the associated radial recess.

The inner wall 102 of a notch is radially offset from the inner wall 52 of the associated radial recess 50 of the crown 22 along the radial central axis A50 to the extent that the inner wall 102 of the notch does not extend at the same radial level as the inner wall 52 and thus does not face the inner wall 52 of the radial recess in any direction taken perpendicular to the axis A50 of the radial recess 50.

The minimum width of a notch 100, measured between its two planar faces 104 and corresponding to the diameter of the curved face 106, is denoted "L104," and the minimum width of a notch 100, measured at the outer stop 108, is denoted "L108," the minimum width L108 being measured perpendicular to the axis A50 at the radial recess 50.

Advantageously, the width L104 is substantially equal to the diameter D50. In other words, the diameter of the curved face 106 of a notch is substantially equal to the diameter of the radial recesses 50. Furthermore, the width L104 is substantially equal to or greater than the diameter D14.

Advantageously, the width L108 is substantially equal to the width L54, and smaller than the diameter D14.

Advantageously, the radial thickness E16 of the ring 16 is less than the width L104 of the notches 100, preferably less than 50% of the width L104, more preferably less than 35% of the width of the notch.

A radial recess 50 of the crown 22 and the associated notch 100 together form a receiving volume V50 for a locking ball 14.

When a locking ball 14 is mounted in a receiving volume V50, the locking ball is movable radially to the longitudinal axis X12, parallel to the axis A50, between an outer unlocked position and an inner locked position.

Figure 8:
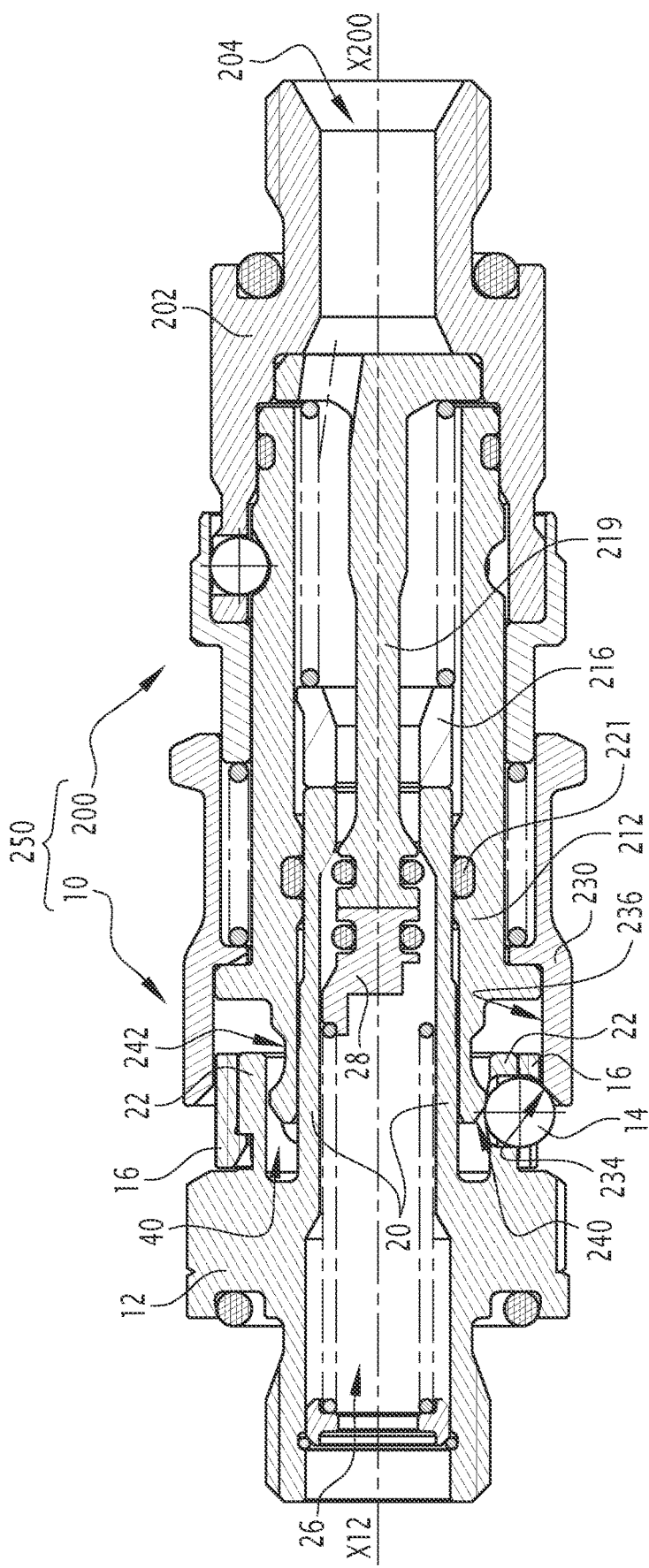
FIG. 8 is a cross section of a fluid connection according to the invention, comprising the male element of FIGS. 1 to 6 and the female element of FIG. 7, with the fluid connection being in a coupled configuration.

In the outer position, as can be seen in FIG. 8, the locking ball 14 partially protrudes from the outer radial face 82 of the ring 16. Furthermore, in the outer position, the locking ball abuts the outer stop 108 of the notch 100. Thus, when the ring 16 is mounted on the male body 12, the outer stop 108 prevents the locking ball from moving outwardly, in particular beyond the outer unlocked position thereof, such that the locking ball cannot fully exit the radial recess 50 through the outer face 46. In other words, the outer stop 108 limits the movement of the locking ball 14 radially outwardly while the locking ball 14 is in the radial recess 50.

In the inner position, the locking ball partially projects from the inner face 44 of the crown 22 into the annular space 40 but does not project from the outer face 82 of the ring 16. Furthermore, in this position, the locking ball partially protrudes from the outer face 46 of the crown. In practice, in the inner position, the locking ball is flush with the outer face 82 of the ring, as can be seen in FIG. 5. Further, in the inner position, the locking ball abuts the inner stop 54 of the radial recess 50, such that said locking ball cannot move any closer to the longitudinal axes X12 and X16.

Thus, the inner stop 54 and outer stop 108 form radial retention constrictions for the locking balls in the radial recess 50 and receiving volume V50 thereof. The inner stop 54 is formed exclusively on the male body 12. The outer stop 108 is formed exclusively on the ring 16.

The cylindrical inner wall 52 of the radial recess 50 guides the radial movement of the locking ball 14 in the receiving volume V50 between the inner and outer positions thereof.

The ring 16 comprises an annular distal portion 110. In practice, the annular distal portion of the ring extends longitudinally along the axis X16 from the front face 86 of the ring to the level of the bottom of the notches 100, i.e., to the curved faces 106 of the notches. In other words, the annular distal portion 110 constitutes the front end of the ring 16. In other words, the curved face 106 in a cylindrical portion of each notch 100 is tangent with the annular distal portion of the ring, along the longitudinal axis X16.

The ring 16 comprises tabs 112, each of which corresponds to an end portion of the ring, and in particular, in the example of the first embodiment, to a proximal axial end portion. The tabs extend from the distal annular portion 110 and are each circumferentially delimited by two adjacent longitudinal notches 100 and longitudinally by the rear face 84 of the ring. The tabs 112 constitute flexible portions of the ring which are resiliently deformable relative to the annular distal portion 110.

In practice, each inner tooth 90 is comprised by a tab 112. The rear free ends 91 thus correspond to the axial ends of the tabs, and each tab thus comprises an inner tooth 90 that projects radially inwardly from the inner cylindrical face 80 of the ring 16. Thus, at each inner tooth, the radial thickness of the tab 112 is greater than the radial thickness of the rest of the tab, in particular greater than the radial thickness of the tab at the longitudinal level of the bottom of the notch 100. In other words, each inner tooth 90 is comprised by a rear free end 91 of a tab 112.

The length L92 is less than half the length L100. The teeth 90 are therefore arranged at the rear end of the tabs 112.

The circumferential width of the tabs 112, and the maximum length of each of said tabs, measured along the longitudinal axis X16, between the rear face 84 and the curved face 106 are much greater, i.e., at least four times greater, than the radial thickness E16 of the ring.

The distal annular portion 110 forms the front face of the ring. The inner diameter of the distal annular portion, denoted "D110," is equal, while allowing radial operating clearances, to the diameter D46 of the outer face 46 of the crown 22, for mounting the distal annular portion 110 around the crown 22 with reduced radial clearance.

The front face 48 of the crown and the front face 86 of the ring are flush, along the longitudinal axis X12.

Prior to mounting the ring 16 on the crown 22, a locking ball 14 is inserted into each radial recess 50 from the outer face 46 of the crown.

The ring 16 is mounted on the crown 22, by clipping, during a translational movement along the longitudinal axes X12 and X16 from front to rear. In practice, during said clipping, the tabs 112 are resiliently deformed, in particular in a direction radial to the longitudinal axes, around the crown.

The ring 16 is therefore mounted on the crown 22 firstly by aligning the ring with the crown, i.e., by positioning the ring such that its longitudinal axis X16 coincides with the longitudinal axis X12, then by positioning the rear faces 94 of the inner teeth 90 longitudinally opposite the front face 48 of the crown, and by positioning the notches 100 longitudinally opposite the locking balls 14.

Then, the ring 16 is brought longitudinally closer to the crown 22, in a mounting movement of the ring directed toward the rear of the male body 12, such that the inclined rear face 94 of each inner tooth 90 comes into contact with the front face 48 of the crown and is spread apart by the crown, by a resilient outer radial deformation of the tabs 112, the inner faces 96 of the teeth sliding on the outer face 46 of the crown until the inner teeth come to radially face the outer grooves 60 of the crown over their entire length L92. At this stage of mounting, an angular adjustment of the ring may be necessary to align the notches of the ring with the radial recesses 50 of the crown, and thus the inner teeth with the outer grooves. The inner teeth then resiliently close into the outer grooves, such that the planar front faces 92 of the teeth then extend in a plane perpendicular to the longitudinal axis X12.

Thus, for mounting the ring 16 on the male body 12, each inner tooth 90 is movable radially inwardly from a disengaged position out of the outer groove 60 to an engaged position in the outer groove 60. The inner teeth 90 in the disengaged position extend beyond the outer face 46 of the crown 22 outwardly radially at the axis X12.

In FIG. 4, the ring 16 is shown schematically, in dotted lines, in a position in the process of approaching the crown, i.e., in a position in which the tabs 112 are resiliently deformed and where the inner faces 96 of the teeth 90 slide on the outer face 46 of the crown 22. Each inner tooth 90 is then in a disengaged position.

During said approaching movement, and owing to the fact that the width L104 of the notches 100 is substantially equal to or greater than the diameter D14 of the locking balls 14, the ring 16 is placed around the locking balls, and therefore does not apply any force to the balls. Upon completion of this approaching movement, the front face 92 of each inner tooth 90 is then opposite, in the forward longitudinal direction, the axial front face 64 delimiting one of the outer grooves 60.

The forward movement of the ring 16 relative to the male body 12 is limited by the abutment of the front faces 92 of the inner teeth 90 against the axial front faces 64 of the outer grooves 60. This limitation of the longitudinal movement of the ring thus allows the outer stops 108 of the notches 100 to be positioned longitudinally with respect to the radial recesses 50. Moreover, this abutment of the inner teeth of the ring against the front faces 64 of the outer grooves does not create any radial component that could lead to unclipping of the ring, which makes it possible to avoid any accidental unclipping of the ring.

A small amount of axial play, i.e., along the longitudinal axis X12, of the inner teeth 90 in the outer grooves 60 is necessary to allow the teeth to be clipped into the outer grooves and to not stress the locking balls 14. Each notch 100 faces a locking ball 14 in the rearward longitudinal direction at least when the locking ball 14 is in the inner position. Rearward movement of the ring 16 relative to the male body 12 is limited by the notches abutting the locking balls, which are themselves held in the radial recesses 50 thereof by the outer stops 108 of the notches.

In practice, in the example, the longitudinal movement of the ring 16 with respect to the male body 12 is limited to 0.25 mm, or 5% of the length L16 of the ring.

The inner face 96 of each inner tooth 90 faces the transverse bottom face 66 of one of the outer grooves 60, in the two directions C circumferential to the longitudinal axis X12. In other words, and as best seen in FIG. 6, each coplanar face portion 98 faces the transverse bottom face 66 in only one of the two circumferential directions. This cooperation between the inner faces 96 and the transverse bottom faces 66 allows the ring 16 to be angularly positioned on the crown 22, i.e., to limit the relative circumferential movement of the ring with respect to the crown, for example to less than 5° about the longitudinal axis X16. Thus, the notches 100 are angularly positioned in a reliable and precise manner with respect to the radial recesses 50 of the crown. In addition, this cooperation allows the ring 16 to abut the transverse bottom faces 66 blocking the rotation of the ring 16 with respect to the male body 12, for each of the two circumferential directions. In one variant (not shown), each face portion 98 of the same inner tooth 90 cooperates with its own outer groove.

When the ring 16 is mounted on the crown 22, the transverse bottom faces 66, the front face 64, and the locking balls 14 form an obstacle to the movement of each inner tooth 90 out of the outer groove 60 thereof in the two directions circumferential to the axis X12 and in the two directions parallel to the longitudinal axis X12. Only a movement of the inner teeth 90 having a radial component at the axis X12 and directed outwardly allows the inner teeth 90 to be moved out of the outer grooves 60.

Taken at the radial recesses 50, i.e., away from the inner teeth 90, the radial thickness E16 of the ring 16 is less than the radial thickness E22 of the crown 22. In particular, the radial thickness E16 of the ring taken at the radial recess 50 is strictly less than the radius R14 of the locking ball 14, i.e., half the diameter D14. Moreover, the radial thickness E16 is substantially equal to the radial distance between the outer face 46 of the crown 22 and the outer face 82 of the ring.

The tabs 112, and in particular the rear free ends 91 thereof, are able to resiliently deform radially to the axis X12 between the position thereof engaged in the outer groove 60 thereof and the position thereof disengaged from the outer groove 60 thereof to allow the teeth 90 to be mounted and possibly dismounted from the outer grooves 60. During assembly, the radial deformation of the tabs 112 is therefore greater at the longitudinal level of the inner teeth 90 than at the longitudinal level of the curved faces 106.

Figure 7:
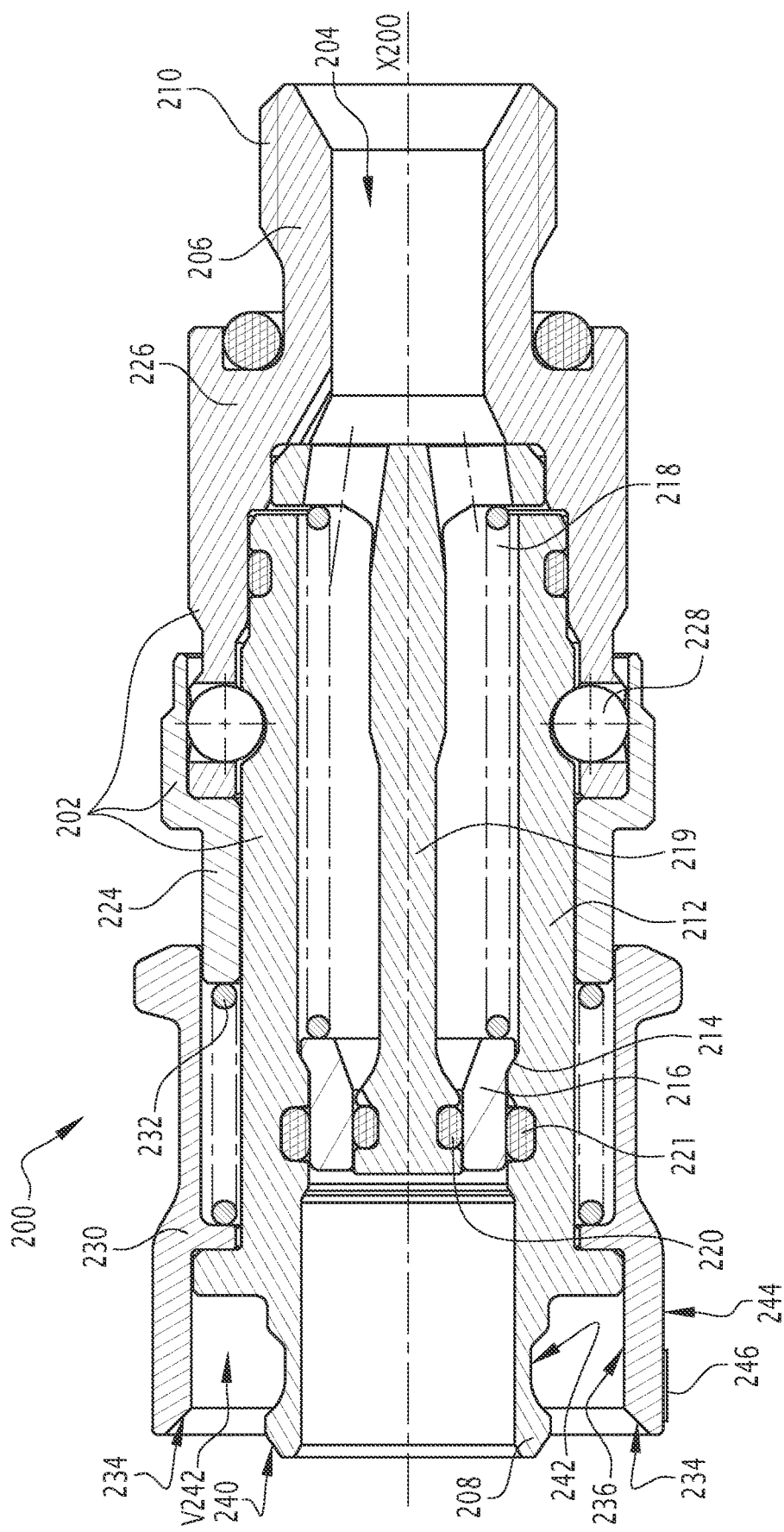
FIG. 7 is a cross section of a female fluid connection element.

FIG. 7 depicts a female fluid connection element 200.

The female element 200 is designed to be coupled with the male element 10 of FIGS. 1 to 6, so as to form a fluid connection.

The female element 4 comprises a female body 202, which extends along a longitudinal axis X200 that coincides with the longitudinal axes X12 and X16 when the female element is coupled with the male element 10. The female body 202 of the female element 200 is made of metal, for example aluminum or brass.

The female body 202 is hollow, rotationally symmetrical about the longitudinal axis X200, and delimits an inner through-conduit 204, the distal end of which is designed to receive the tubular extension 20 of the male element 10.

The female body 202 has a proximal end 206 and a distal end 208. The inner conduit 204 opens onto the ends 206 and 208. On the proximal end 206 side, the exterior of the female body 202 comprises a thread 210 such that it can be attached to a pipe (not shown).

On the distal end 208 side, the inner conduit 204 is housed within a cylindrical extension 212 of the female body 202. The cylindrical extension 212 has an inner bulge 214 that forms an abutment for an annular valve 216 movable within the inner conduit 204 along the longitudinal axis X200 between an advanced position for sealing the inner conduit 204 and a retracted position for opening the inner conduit 204. In FIG. 7, the valve is shown in the position for sealing the inner conduit. The annular valve 216 is pushed forward from the female body 202 by a coil spring 218.

The annular valve 216 surrounds a fixed tappet 219 that extends along the longitudinal axis X200. The tappet is fixed within the inner conduit 204 and has an outer peripheral groove in which a sealing element 220 is housed. In the example of the figures, the sealing element 220 is an O-ring.

The female element 200 also comprises a sealing element 221, which is housed in an inner peripheral groove provided at the distal end 208 of the cylindrical extension 212. In the example of the figures, the sealing element 221 is an O-ring.

The female body 202 also comprises an outer sleeve 224, an adapter 226, and assembly balls 228. The cylindrical extension 212, the outer sleeve 224, the adapter 226, and the assembly balls 228 are rigidly attached to each other by plastically deforming the proximal end of the outer sleeve 224 around a recess in the adapter 226 for the assembly balls 228. This plastic deformation of the outer sleeve 224 is not shown in the figures.

The female element 200 also comprises a locking sleeve 230 mounted around the cylindrical extension 212 and the outer sleeve 224.

The locking sleeve 230 is pushed forward into a so-called "locking" position against a stop of the cylindrical extension 212 by a return spring 232, which jointly abuts the outer sleeve 224 and the locking sleeve 230. This position is shown in FIG. 7.

The locking sleeve 230 has a front face 234 and a radially inner locking face 236, both of which are oriented toward the axis X200. The front face 234 diverges forwardly from the longitudinal axis X200. The locking face 236 has a circular cross-sectional cylinder shape centered on the longitudinal axis X200.

The cylindrical extension 212 has, at the distal end 208 thereof, an inclined outer face 240 and an outer annular locking groove 242. The inclined outer face 240 converges forwardly with respect to the longitudinal axis X200 and is arranged further forward than the outer annular groove 242. In the locked position of the locking sleeve 230, the inclined outer face 240 extends beyond the front face 234 in the forward longitudinal direction X.

The outer annular groove 242 has a toroidal cross-sectional shape centered on the longitudinal axis X200, is oriented outward, and is designed to partially receive the locking balls 14 of the male element 10.

Advantageously, the outer radial face 244 of the locking sleeve 230 comprises a color marking 246, the color of which is selected to be identical to the color of the ring 16 of the male connection element 10. Thus, in an industrial environment where many connection elements may be present, the identical colors of the color marking 246 and the ring 16 make it simple to associate the male element 10 with the female element 200.

Figure 9:
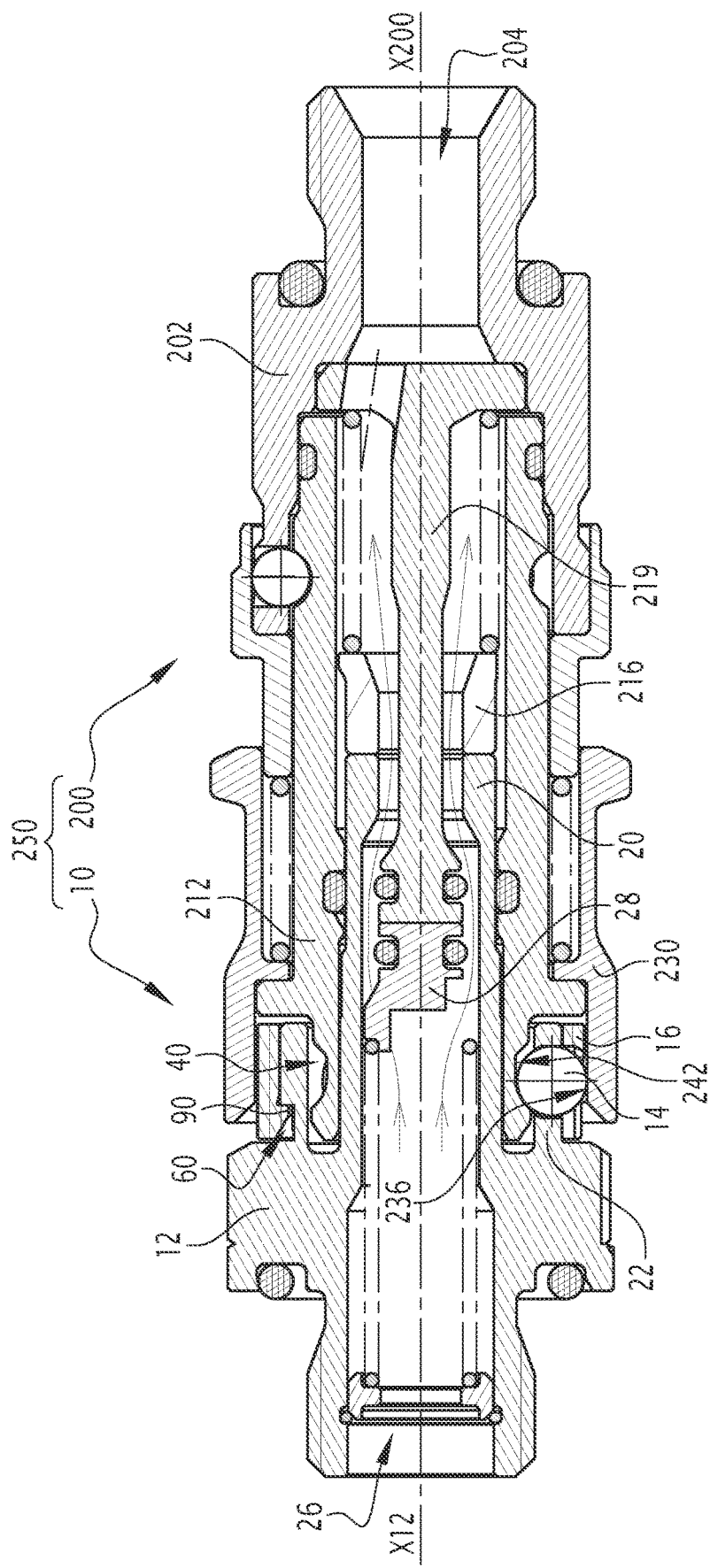
FIG. 9 is a cross section of the fluid connection of FIG. 8, with the fluid connection being in a coupled configuration.

FIGS. 8 and 9 show the connection, or coupling, of the female fluid connection element 200 to the male fluid connection element 10. When coupled together, the male fluid connection element 10 and the female fluid connection element 200 form a fluid connection 250.

In FIG. 8, the fluid connection 250 is in a coupling configuration, i.e., the male element is in the process of engaging with the female element.

In FIG. 9, the fluid connection 250 is in a coupled configuration, i.e., the male element is engaged with the female element.

In a first coupling phase, the male element 10 and the female element 200 are aligned such that the longitudinal axes X12 and X200 coincide, then the tubular extension 20 of the male element 10 is brought closer to the female element 200 along the longitudinal engagement axis X12 and penetrates into the cylindrical extension 212 until the distal end 21 thereof comes into contact with the annular valve 216 and the valve 28 of the male element 10 comes into contact with the fixed tappet 219.

In a later stage of the approach, which is illustrated in FIG. 8, the distal end 208 of the female element 200 penetrates into the annular space 40 of the male body 12 and the inclined outer face 240 of the cylindrical extension 212 pushes the locking balls 14 toward the outer unlocked position thereof. The tubular extension 20 comes into sealing contact with the sealing element 221.

As the approach continues, the locking balls 14, which are now projecting from the outer radial face 82 of the ring 16, come into contact with the front face 234 of the locking sleeve 230 and push the locking sleeve 230 back from the female element 200 against the spring 232 until the locking balls 14 face the outer annular groove 242 of the female body 202 of the female element 200. At this point, the locking sleeve 230, pushed by the spring 232 toward the locked position thereof, pushes the locking balls 14 back into the outer annular groove 242, in an inner position, in which they are held by the locking face 236 of the locking sleeve 230. This configuration corresponds to the configuration of FIG. 9. The locking face 236 is radially aligned with the outer annular groove 242. The locking balls 14 then form an obstacle to longitudinal movement of the cylindrical extension 212 of the female element 200 out of the annular space 40. The fluid connection 250 is coupled.

In the coupled configuration of FIG. 9, the valve 28 of the male element 10 is pushed back by the fixed tappet 219, within the inner conduit 26, toward the rear of the male element 10 into the open position thereof. In conjunction, the annular valve 216 is pushed back by the tubular extension 20 of the male element 10 into an open position, in which a fluid can freely flow between the inner conduit 204 and the inner conduit 26.

Thus, in this configuration, the male element 10 and the female element 200 are jointly in the open position and the inner conduits 26 and 204 are in fluid communication with each other. The sealing element 221 provides a seal between the cylindrical extension 212 and the tubular extension 20.

The pipe associated with the male element 10 is then connected to the pipe associated with the female element 200 and a fluid can flow from the male element to the female element. This flow is represented by arrows in FIG. 9, showing the path of a fluid through the fluid connection 250.

The coupling is said to be automatic since the only movement of bringing the female body 202 of the female element 200 and the body 12 of the male element 10 closer together along the longitudinal axes X12 and X200 makes it possible to achieve the coupled configuration.

As seen in FIG. 9, in the coupled configuration of the fluid connection 250 and in the locked position of the locking sleeve 230, the locking face 236 is located opposite the outer annular groove 242 in a direction radial to the axis X200. The locking face 236 and the outer annular groove 242 then define a receiving volume V242 for the locking balls 14. In other words, the locking face 236 radially limits the receiving volume V242 so that the locking balls 14 are held in their inner locked position and cannot move to their outer unlocked position.

In particular, in the coupled configuration of the fluid connection 250 and in the locked position of the locking sleeve 230, the locking sleeve surrounds the ring 16, and in particular the notches 100, and thereby radially overlaps the locking balls 14. The locking sleeve thus holds the locking balls 14 in an inner locked position in which they are engaged in the outer annular groove 242 of the female body 202, which is itself engaged in the annular space 40, to hold the female body in the male body 12.

When the locking balls 14 are coupled in the inner position, with the balls in contact with the locking face 236 of the locking sleeve 230, the inner walls 52 of the radial recesses 50 are arranged all around the center of the locking balls. In other words, and as seen in FIG. 9, in a radial direction, the center of each locking ball 14 is aligned with the radial recesses 50 and remote from the ring 16. In FIGS. 8 and 9, the center of the ball is marked by the intersection of two perpendicular lines. Thus, in the inner position, the balls can only come into contact with the crown 22, but not into contact with the ring 16, to oppose a relative movement of the female element 200 in the male element 10, in particular a withdrawal movement, in the coupled configuration. The fact that the inner wall 52 of the radial recesses 50 is arranged all around the center of the locking balls 14 in the coupled configuration of the fluid connection 250 is particularly advantageous, as this prevents the locking balls from exerting forces on the ring 16. Thus, it is possible to make the ring 16 from a material with poorer mechanical properties than the male body 12, such as a polymeric material, which makes the ring 16 simpler and less expensive to manufacture.

Under the action of a force which is exerted rearwardly on the locking sleeve 230 and is strong enough to overcome the force of the spring 232, the locking sleeve 230 is able to be moved in axial translation toward the rear of the female element 200, by an operator, into a so-called "unlocked" position. In the unlocked position, the locking face 236 is offset rearwardly with respect to the outer annular groove 242 and the receiving volume V242 is no longer radially limited by the locking face 236 but by the front face 234. The locking balls 14 are then free to move to the outer position thereof.

Thus, to uncouple the fluid connection 250, the operator moves the locking sleeve 230 to the unlocked position, which allows the locking balls 14 to move to the outer unlocked position and clear the passage for the cylindrical extension 212 of the female element 200 out of the annular space 40 of the male element 10. When the cylindrical extension 212 has been removed, the valves 28 and 216 close.

Owing to the ring 16, which is mounted on the male body 12, the outer stops 108 which make it possible to hold the locking balls 16 in the radial recesses 50 of the crown 22 are formed outside the male body, i.e., they are not formed on the male body, which makes it possible to produce an integral male body forming both the crown 22 and the tubular extension 20. This solution makes it possible, in particular, to simplify the construction of the male element 12 and to reduce its size, which is advantageous.

Moreover, the notches 100 forming longitudinal slots facilitate the resilient deformation of the tabs 112 of the ring 16, which makes it possible to simplify mounting the ring on the crown 22 by clipping. Apart from the locking balls 14, the other parts of the male element 10 being monobloc, the assembly of the male element 10 is therefore particularly simple.

Furthermore, the ring 16 is held on the male body 12 in the two longitudinal directions, rearwardly by abutting the locking balls 14 and forwardly by abutting the axial front faces 64 of the outer grooves 60, and in the two circumferential directions, by means of the coplanar face portions 98 abutting the transverse bottom face 66 of the outer grooves, which makes it possible to limit the stresses during clip-on mounting of the ring on the male body.

Owing to the shape of the notches 100 in the ring 16, the contact between the locking balls 14 and the outer stops 108 is not limited to one point, but is distributed around the radial central axes A50, which allows for a better distribution of the forces on the ring and makes it possible to limit the jamming of the locking balls in the outer position. Thus, the operation of the male element 10 is more reliable, which reduces the risks of damage or blockages when coupling and uncoupling the fluid connection 250.

In addition, each outer groove 60 is angularly offset, along an orthoradial direction, from the radial recesses 50 accommodating the locking balls 14, thereby limiting embrittlement of the crown 22. This also allows the inner wall 52 of each radial recess 50 in the crown to have an identical radial height all around the radial central axis A50 and constitutes the support against which the locking ball housed in said recess exerts a force in the coupled configuration of the fluid connection 250. Furthermore, this arrangement allows the length of the crown to be reduced, since the outer grooves can be located at least partially at the longitudinal level occupied by the radial recesses 50, which improves the compactness of the male element 10.

In addition, the annular distal portion 110 of the ring 16 improves the robustness of the ring.

As the inner wall 52 of each radial recess 50 intersects, over the entire contour thereof, with the surface of constant diameter D46 forming the outer face 46 of the crown, the design of the outer grooves 60 on the crown 22 is simplified and the outer grooves 60 can be positioned, along the longitudinal axis X12, at least partially behind the radial recesses 50 to reduce the resilient clip-on force of the ring 16.

A second, third, fourth, and fifth embodiment of the male connection element 10 are shown in FIGS. 10 to 21. In each embodiment described hereinafter, elements similar to those in the preceding embodiment(s) are referenced in the same manner and function in the same way. In the following, differences between one embodiment and the previous embodiment(s) are primarily described.

Furthermore, if a component is mentioned in the description of an embodiment without being shown in FIGS. 10 to 21, it corresponds to the same component shown in FIGS. 1 to 9 for the first embodiment.

Figure 10:
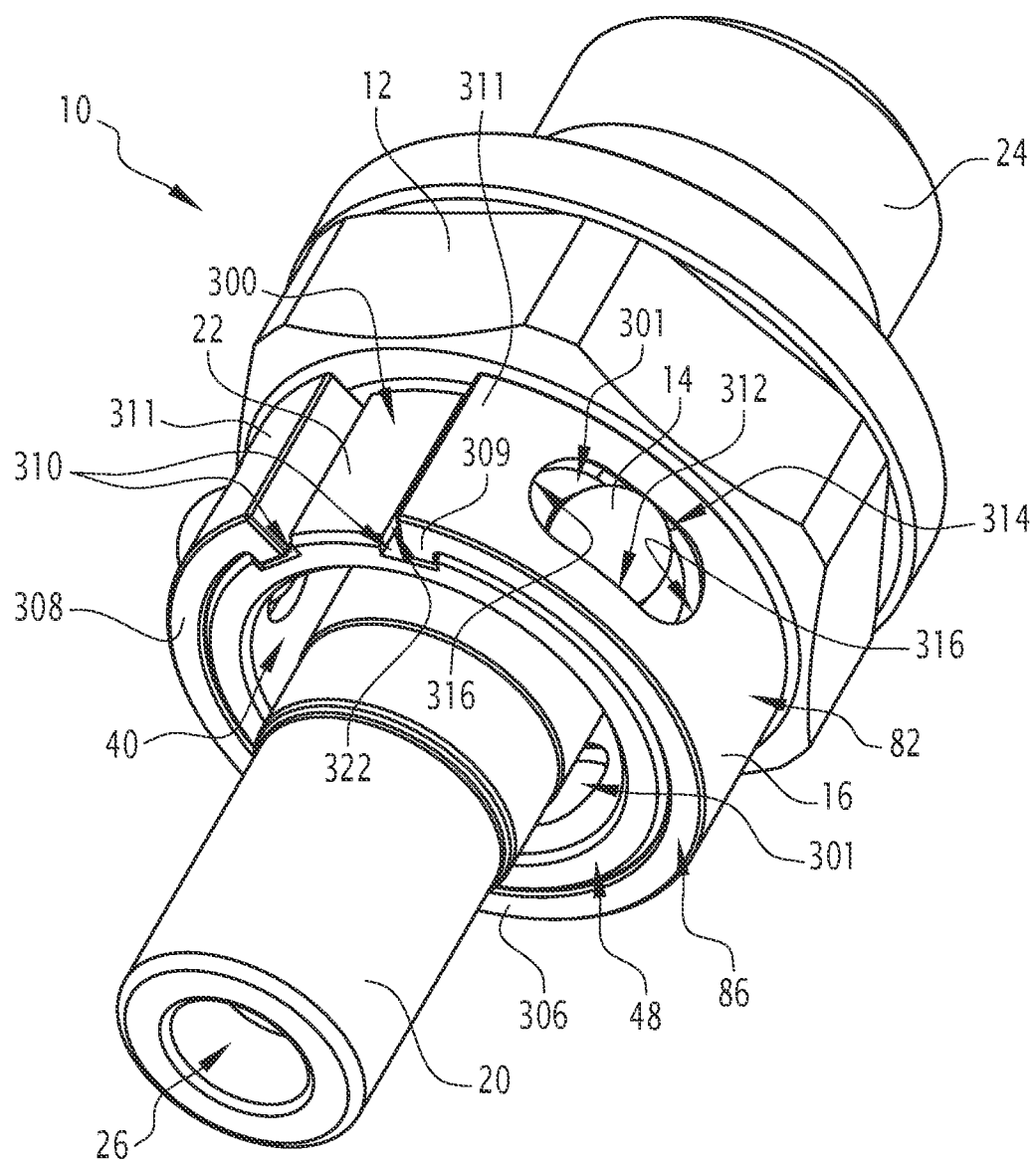
FIG. 10 is a perspective view of a male fluid connection element according to a second embodiment of the invention.
Figure 11:
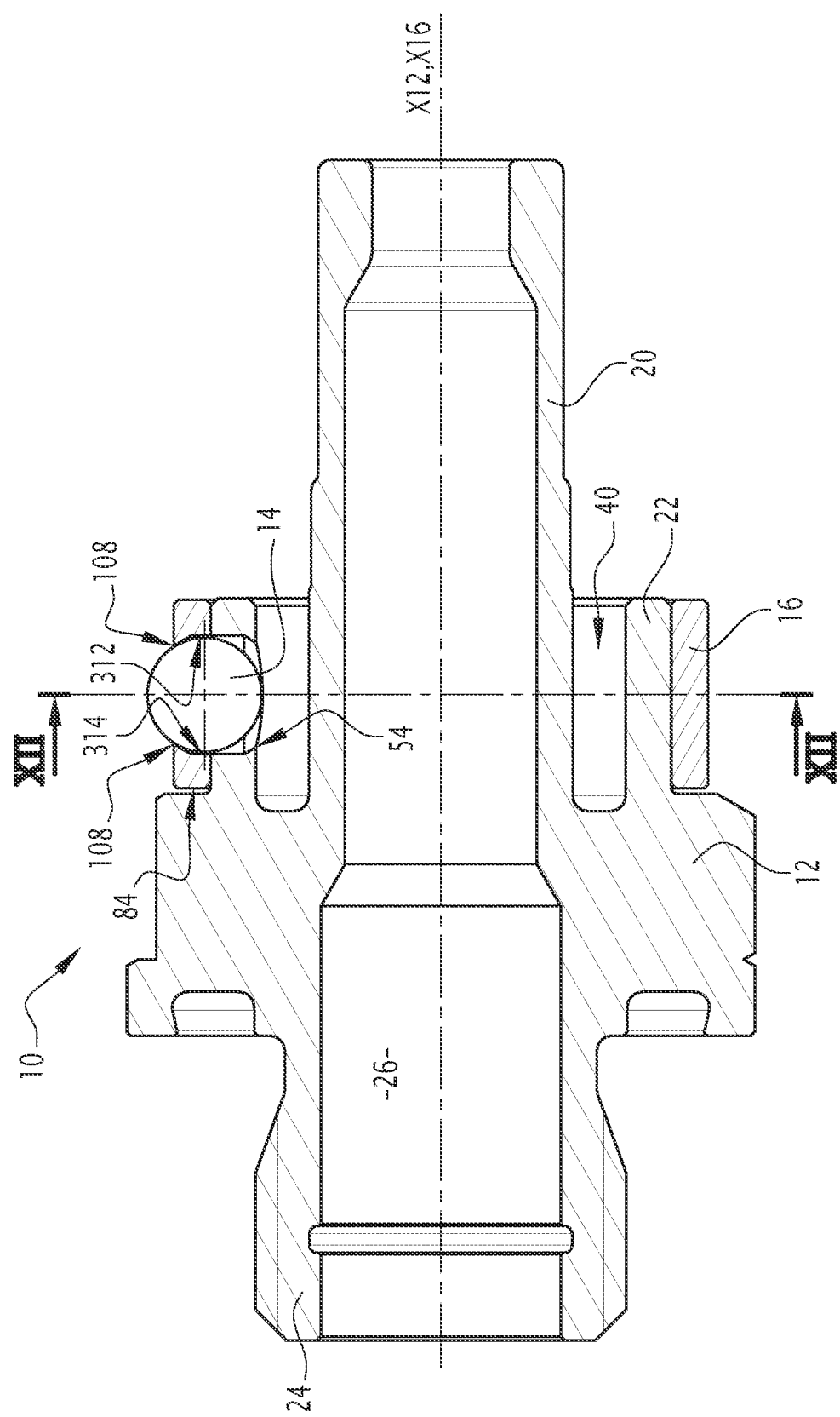
FIG. 11 is a cross section of the male element of FIG. 10.
Figure 12:
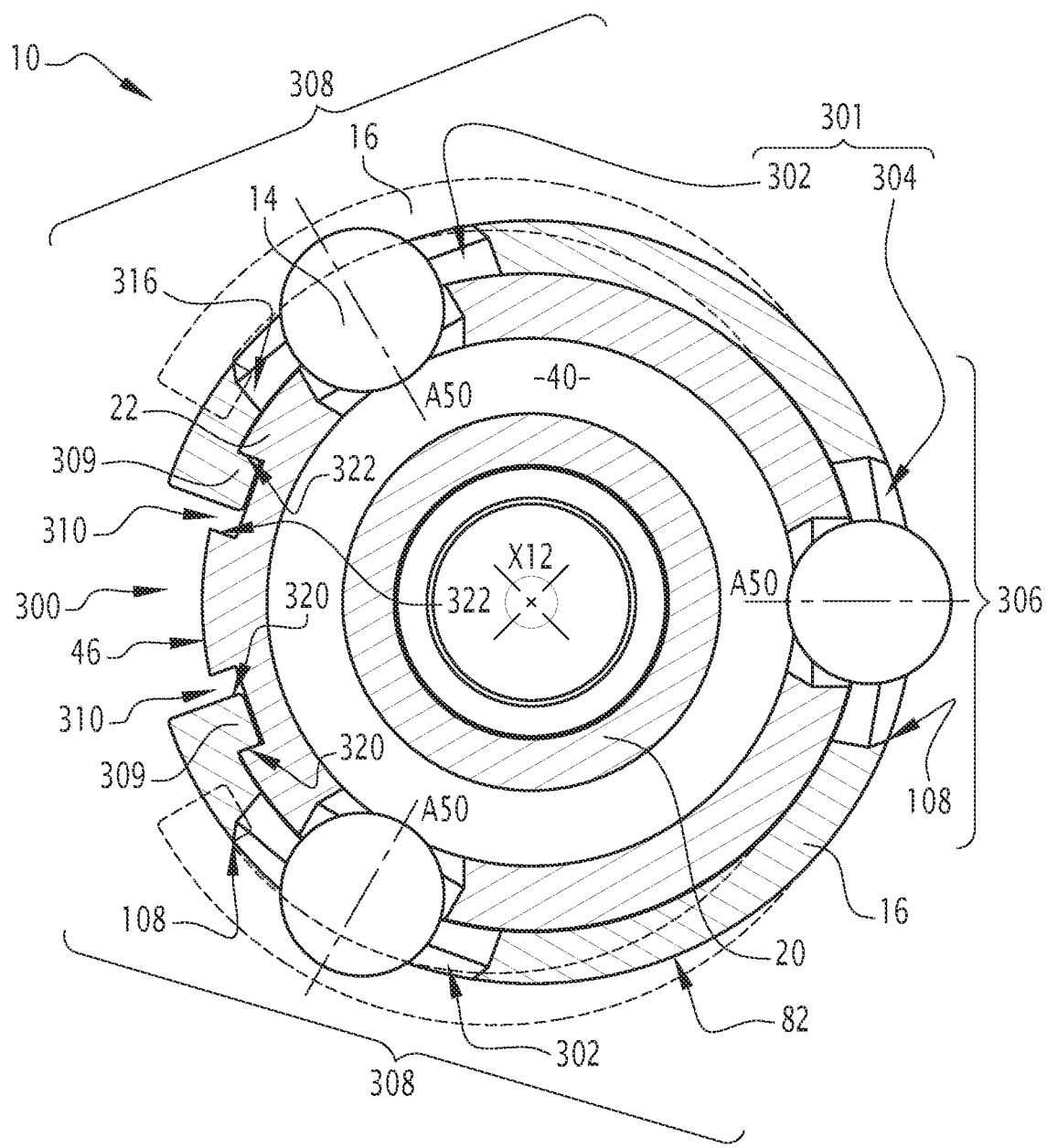
FIG. 12 is a cross section of the male element of FIGS. 10 and 11, along the sectional plane XII of FIG. 11.

The second embodiment is shown in FIGS. 10 to 12.

In FIGS. 10 to 12, the valve 28, the spring 30, and the stop ring 32, forming part of the male element 10 of the second embodiment, are not shown.

One of the main differences of the second embodiment from the first embodiment is that the ring 16 is a slotted ring. Thus, the ring 16 comprises a single longitudinal slot 300 which, along the longitudinal axis X16, opens onto the rear face 84 of the ring 16 and opens onto the front face 86 of the ring and which radially passes through the ring from the inner face 80 to the outer face 82. Thus, the longitudinal slot 300 passes through axially and radially. In addition, the ring 16 also comprises notches 301, which are separate from the longitudinal slot 300.

In the example shown in FIGS. 10 to 12 of the second embodiment, the ring 16 comprises three notches 301. Among the notches 301, the ring comprises two lateral notches 302 and a central notch 304 comprised by a central portion 306 of the ring. Thus, the ring 16 comprises two lateral ring portions 308 formed on either side of the central ring portion 306. Each side portion 308 comprises a side notch 302.

Each lateral portion 308 is thus circumferentially delimited on the one hand by the central portion 306 and on the other hand by the longitudinal slot 300, and each lateral portion is longitudinally delimited by the rear face 84 and by the front face 86 of the ring 16.

The width of the side portions 308, measured along the circumference of the intersection between the rear face 84 and the outer face 82 of the ring, and the length of said side portions, measured along the longitudinal axis X16, are much greater, i.e., at least four times greater, than the radial thickness E16 of the ring. Thus, the two side portions are resiliently deformable, i.e., they are flexible around the central portion 306.

The side portions 308 each form an end portion of the ring 16, and in particular, in the example of the second embodiment, a circumferential end portion of the ring.

In the second embodiment, the ring 16 comprises two inner teeth 309, which are arranged at a circumferential free end 311 of each of the ring end portions, i.e., at the free ends 311 of the resiliently deformable side portions 308, in the vicinity of the longitudinal slot 300. In other words, the inner teeth 309 are comprised by a circumferential free end 311 of the ring end portions 16. When the ring is mounted on the male body 12, the inner teeth 309 are engaged in longitudinal outer grooves 310 in the crown 22, recessed from the outer face 46 of the crown. As seen in FIG. 10, the longitudinal outer grooves 310 open onto the front face 48 of the crown.

Advantageously, the longitudinal outer grooves 310 are angularly offset from the radial recesses 50 of the crown 22. Thus, the locking balls 14 are remote from the outer grooves.

Alternatively, the outer longitudinal grooves 310 do not open onto the front face 48 of the crown, and each groove then forms an axial rear face, which is opposite, in the rearward longitudinal direction, to the front face 86 of the ring 16 and which makes it possible to hold the ring mounted on the male body in the forward longitudinal direction.

Alternatively, a single longitudinal outer groove 310 is formed in the crown 22 to receive the two inner teeth 309.

In the second embodiment, the notches 301 are circumferential notches, i.e., they extend in a circumferential direction, and are in the form of oblong holes. Thus, the inner wall 102 of each notch 301 has a planar front face 312, a planar rear face 314, and two side faces 316 that connect the front and rear faces. In other words, the contour of the intersection between the notches 301 and the outer face 82 of the ring 16 is a closed contour. The outer stop 108 of a notch is formed by two distinct areas, which are provided on the one hand at the junction of the front face 312 of the inner wall 102 with the outer face 82 of the ring 16, and on the other hand at the junction of the rear face 314 with the outer face of the ring. The outer stop of a notch, formed by these two areas, is thus distributed around the radial central axis A50 of the radial recess 50 associated with said notch.

Each inner tooth 309 has two circumferential faces 320, which are planar and each extend in a plane radial to the longitudinal axis X16, i.e., in a plane comprising the longitudinal axis X16 and a direction radial to the longitudinal axis. The circumferential faces 320 of an inner tooth delimit said tooth in a circumferential direction.

Each longitudinal outer groove 310 has two transverse faces 322, each of which is planar and extends in a plane radial to the longitudinal axis X12, i.e., in a plane comprising the longitudinal axis X12 and a direction radial to the longitudinal axis. The transverse faces 322 of an outer groove delimit said groove in a circumferential direction.

For each of the two opposite longitudinal directions, i.e., along the longitudinal axis X16, forward and rearward, the movement of the ring 16 relative to the crown 22 is limited by cooperation of the inner wall 102 and/or the outer stop 108 of a notch 301 with the locking ball 14 mounted in the radial recess 50 associated with said notch, regardless of whether the locking ball is in the outer or inner position.

For each of the two opposite directions circumferential to the axis X16, i.e., according to a rotation about the longitudinal axis X16 in either direction, the movement of the ring 16 with respect to the crown 22 is limited by the male body 12, by cooperation of at least one of the circumferential faces 320 of the teeth 309 of the ring with at least one of the transverse faces 322 of the longitudinal outer grooves 310. In other words, the circumferential faces 320 locking against the transverse faces 322 prevents the ring 16 from rotating along the two directions C circumferential to the longitudinal axis X12.

When the ring 16 is mounted on the crown 22, the transverse faces 322 and the locking elements 14 thus form an obstacle to the movement of each inner tooth 309 out of the longitudinal outer groove 310 thereof in the two longitudinal directions and the two circumferential directions. Similar to the first embodiment, only a movement of the inner teeth 309 having a radial component at the axis X12 and directed outwardly allows the inner teeth 309 to be moved out of the longitudinal outer grooves 310.

In the second embodiment, the ring 16 is mounted on the male body 12 by arranging the ring such that the longitudinal axes X12 and X16 are parallel and such that the longitudinal slot 300 faces the crown 22, then by bringing the ring close to the male body in a direction radial to the axis X12 and by moving the circumferential free ends 311 of the two lateral portions 308 away from each other, the two lateral portions 308 deforming resiliently radially outward.

The ring is thus brought closer to the male body until the longitudinal axis X16 coincides with the longitudinal axis X12. At this point, the two side portions 308 then resiliently close around the crown, with the inner teeth 309 penetrating the outer longitudinal grooves 310.

The ring 16 is dismounted from the crown 22 in the reverse manner to the mounting thereof, i.e., the two lateral portions 308 are resiliently deformed radially outward, until all the inner teeth 309 are disengaged from the outer longitudinal grooves 310, i.e., all the inner teeth 309 are moved radially outward from the engaged position thereof to the disengaged position thereof, and then the ring is moved away from the male body 12 in a direction perpendicular to the axis X12. In FIG. 12, the ring 16 is also shown schematically, in a dotted line, in a deformed or spread configuration, in a position occupied while the ring is being mounted on the male body 12.

In the second embodiment, the ring 16 is made of polymeric material or metal material, such as steel.

Figure 13:
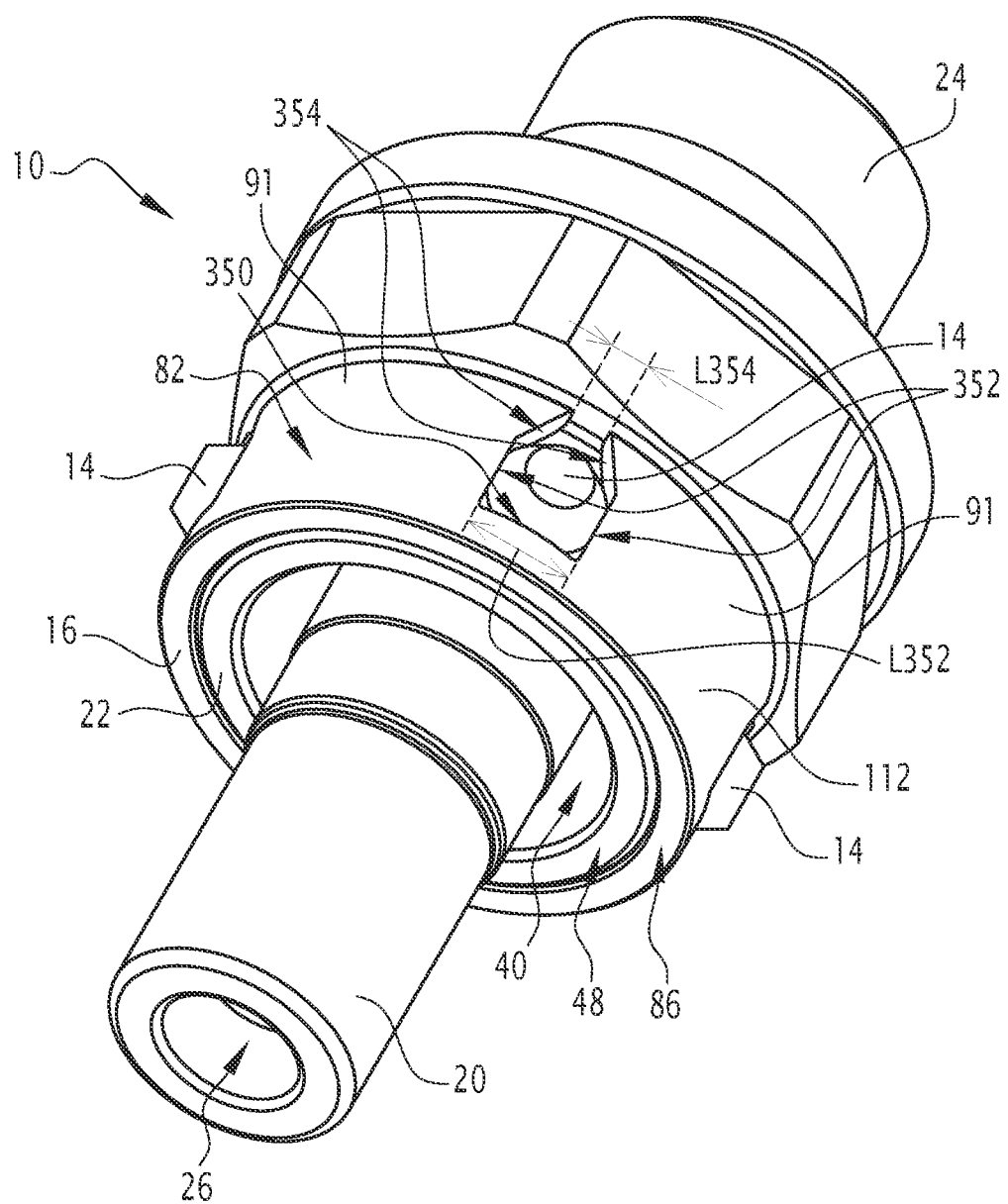
FIG. 13 is a perspective view of a male fluid connection element according to a third embodiment of the invention.
Figure 14:
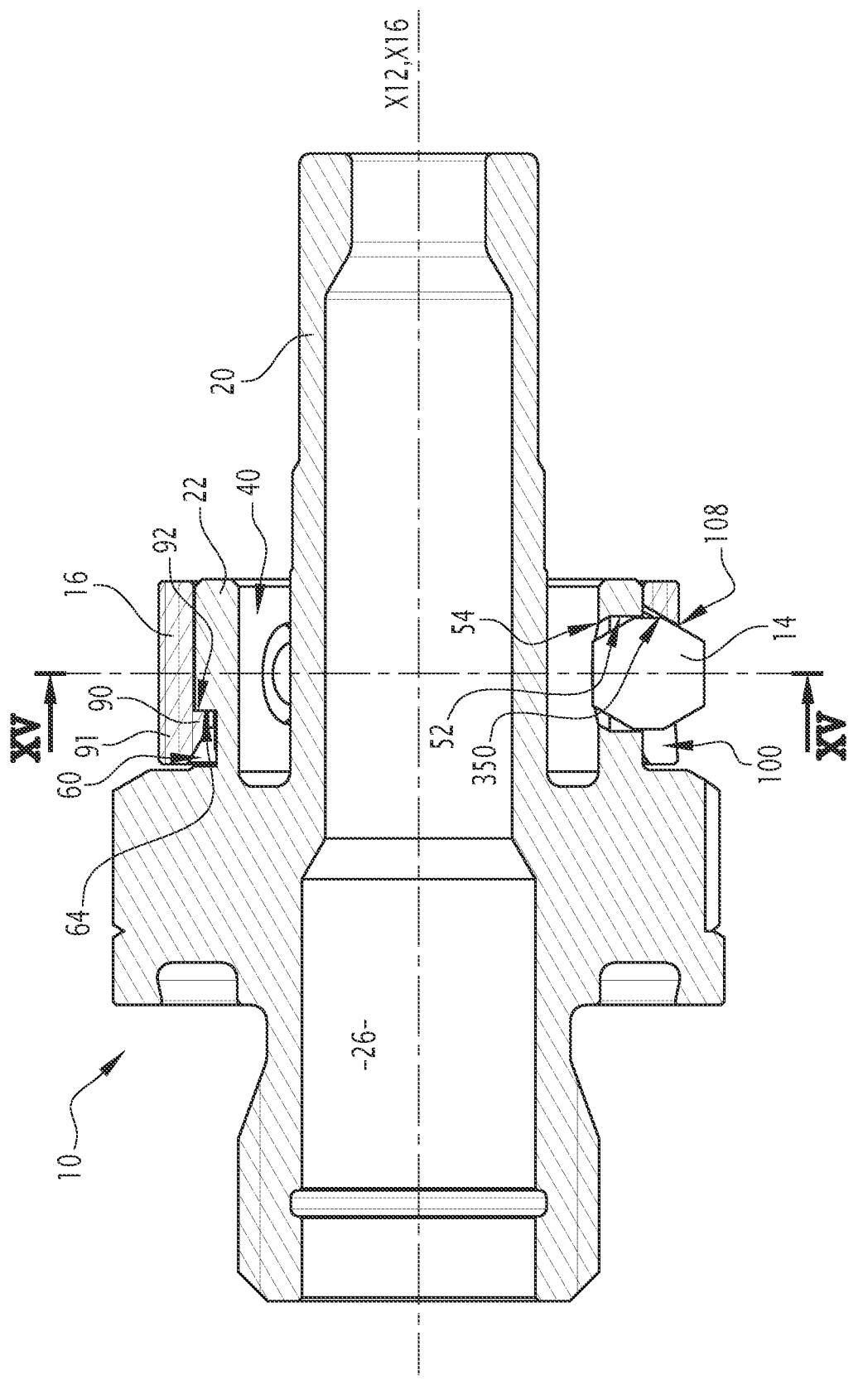
FIG. 14 is a cross section of the male element of FIG. 13.
Figure 15:
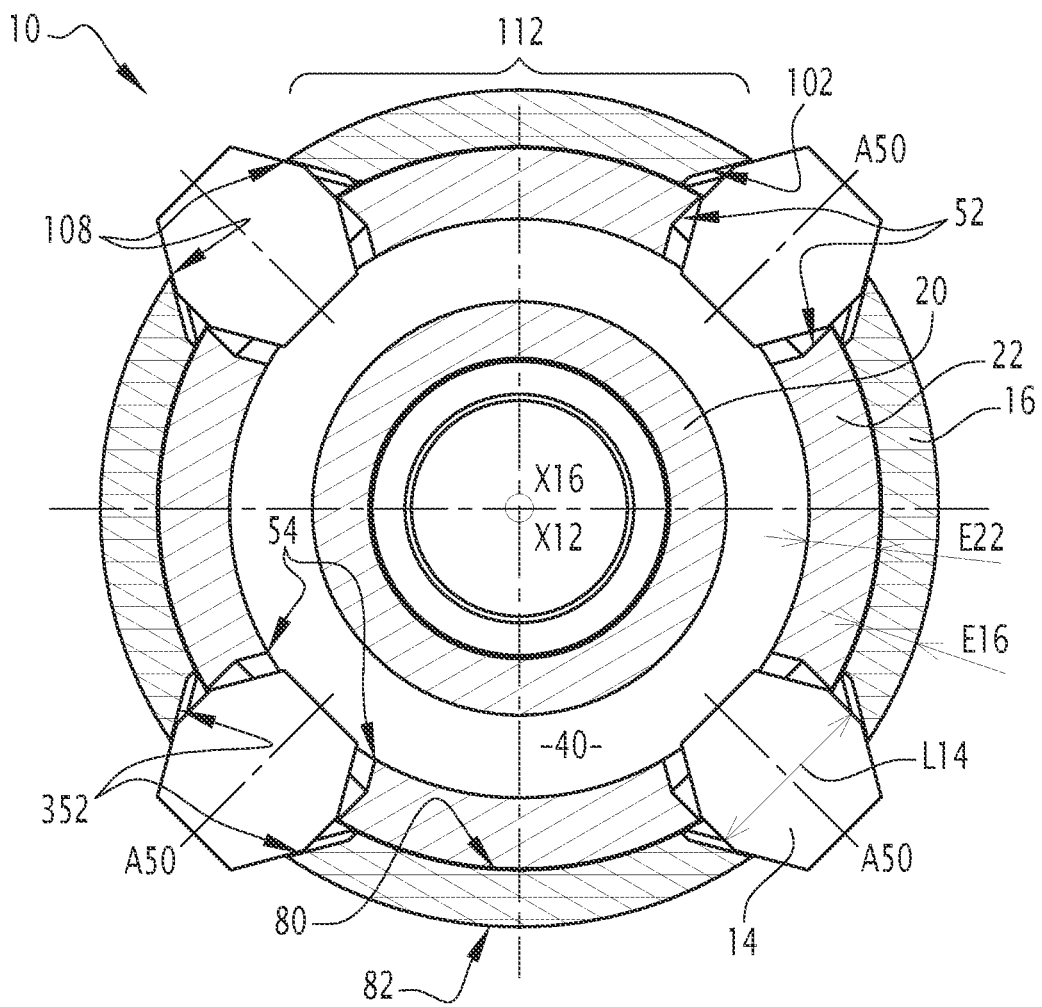
FIG. 15 is a cross section of the male element of FIGS. 13 and 14, along the sectional plane XV of FIG. 14.

The third embodiment of the invention is shown in FIGS. 13 to 15.

In FIGS. 13 to 15, the valve 28, spring 30, and stop ring 32 are not shown.

One of the main differences of the third embodiment from the first and second embodiments is that the outer stop 108 of each notch 100 of the ring 16 is formed by three projections in point contact, about the radial central axis A50, with the locking element 14 associated with said notch. Furthermore, the locking elements 14 are segments.

In the example, each locking segment 14 is a solid of revolution, the axis of rotation of which is the axis A50 of the radial recess 50 accommodating said segment, and the generating surface of which is delimited by a hexagon, two sides of which are perpendicular to the axis A50. The maximum width of a locking segment 14, measured perpendicularly to the axis A50, in the assembled configuration of the male element 10 is denoted by "L14".

As in the first embodiment, the notches 100 open onto the rear face 84 of the ring 16 and pass radially through the ring, and thus open at the inner side 80 and at the outer side 82 of the ring. The notches 100 form longitudinal slots in the ring 16.

In the third embodiment, the inner wall 102 of each notch 100 comprises a front face 350, two side faces 352, and two rear faces 354.

The front face 350 of each notch is planar and oriented such that a line normal to the front face 350 contained in a plane radial to the longitudinal axis X16 intersects with the longitudinal axis X16. In other words, the front face 350 is inclined, relative to a face axial to the longitudinal axis X16. The front face 350 of each notch is inclined such that the intersection between the front face 350 and the outer face 82 of the ring 16 is located further back from the ring, along the longitudinal axis X16, than the intersection between the front face 350 and the inner face 80 of the ring.

As best seen in FIG. 15, the two side faces 352 of each notch are planar and inclined with respect to axis A50. Thus, the junctions between the side faces 352 and the outer face 82 of the ring 16 extend parallel to the axis X16 and are parallel to each other. The two side faces 352 converge toward each other from the inner face 80 of the ring to the outer face 82 of the ring.

The two rear faces 354 extend from the end of the two side faces 352 toward the rear of the ring 16, and open onto the rear face 84 of the ring. Furthermore, along the longitudinal axis X16, the two rear faces 354 converge toward each other as they approach the rear face 84. In other words, in an orthoradial direction, the width between the two rear faces 354 at the lateral faces 352, denoted "L352," is greater than the width between the two rear faces 354 at the rear face 84, denoted "L354."

The outer stop 108 of each notch 100 is formed at the junction between, on the one hand, the outer face 82 of the ring and, on the other hand, the front faces 350 and side faces 352 of the inner wall of the notch, which form the three projections. The outer stop 108 of a notch is thus distributed around the radial central axis A50 of the radial recess 50 associated with said notch, owing to the three projections regularly distributed at 90° around the radial central axis. Each locking segment is thus in point contact with the front face 350 and the two side faces 352 of a notch.

The width L14 of the locking segments 14 is substantially equal to the diameter D50, while allowing operating clearance.

The width L14 of the locking segments is greater than the widths L352 and L354.

Advantageously, the radial thickness E22 of the crown 22 is greater than the radial thickness E16 of the ring 16.

In the third embodiment, the ring 16 is mounted on the male body 12 as in the first embodiment, by clipping, during a translational movement of the ring along the longitudinal axes X12 and X16 from the front to the rear of the male element 10. During said translational movement, the tabs 112 deform resiliently on contact with the locking segments 14, due to the fact that the width L354 of the notches 100 is less than the width L14 of the segments.

As in the first embodiment, when the ring 16 is mounted, forward movement of the ring relative to the crown 22 is limited by the front face 92 of the inner teeth 90 abutting the front face 64 of the outer grooves, and rearward movement of the ring relative to the crown is limited by the notches 100 abutting the associated locking segments 14, and more specifically the front faces 350 of the inner walls 102 abutting the segments, regardless of whether the locking segments are in the outer or inner position.

As in the first embodiment, when the ring is mounted, for each of the two opposite circumferential directions, the movement of the ring relative to the crown is limited by cooperation of the inner teeth 90 with the planar and orthoradial bottom transverse face 66 of the outer grooves 60.

As in the first embodiment, the inner teeth 90 are formed on the rear free end 91 of the tabs 112, and each tab corresponds to an end portion of the ring, and in particular, to a proximal axial end portion of the ring.

Figure 16:
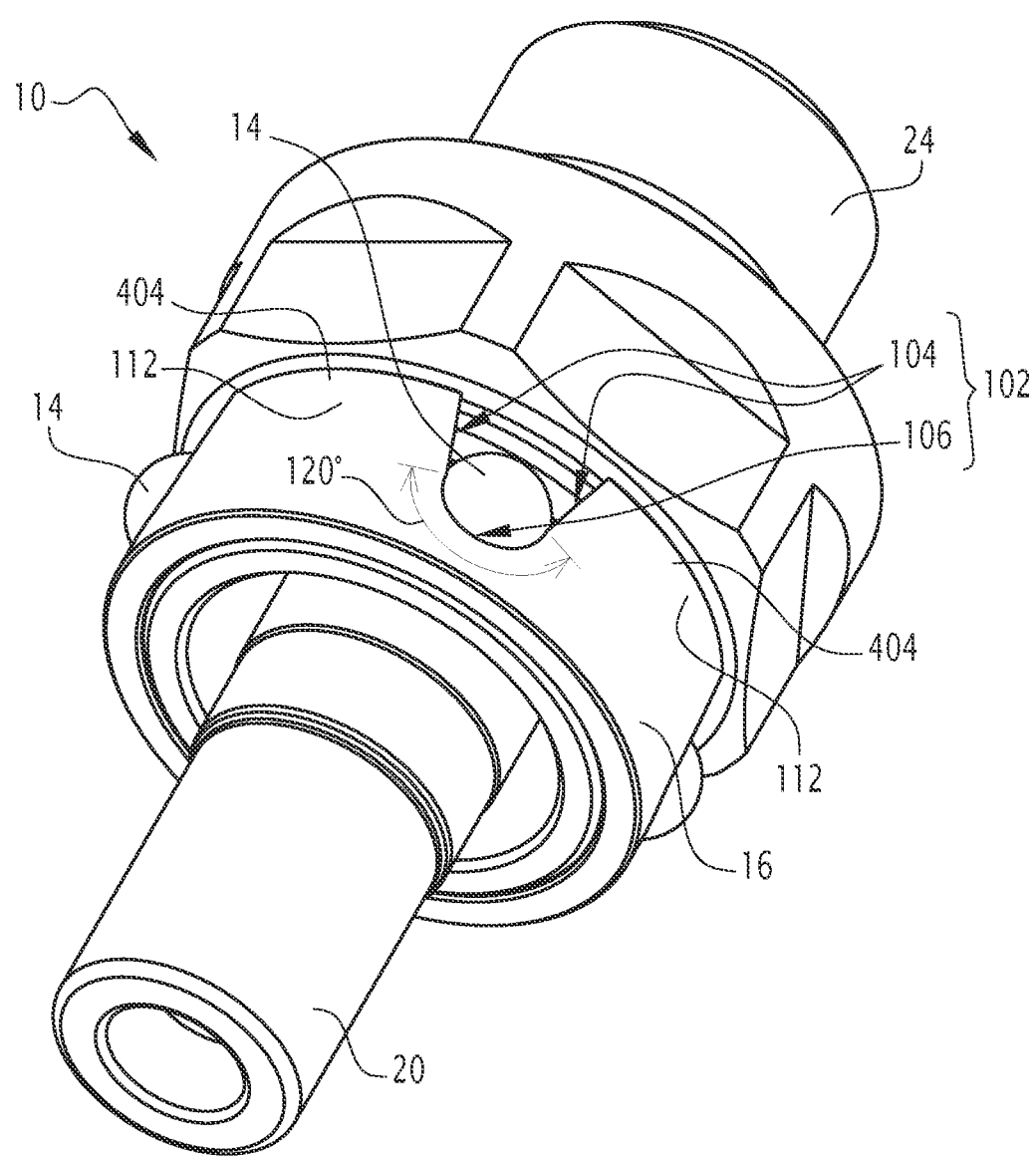
FIG. 16 is a perspective view of a male fluid connection element according to a fourth embodiment of the invention.
Figure 17:
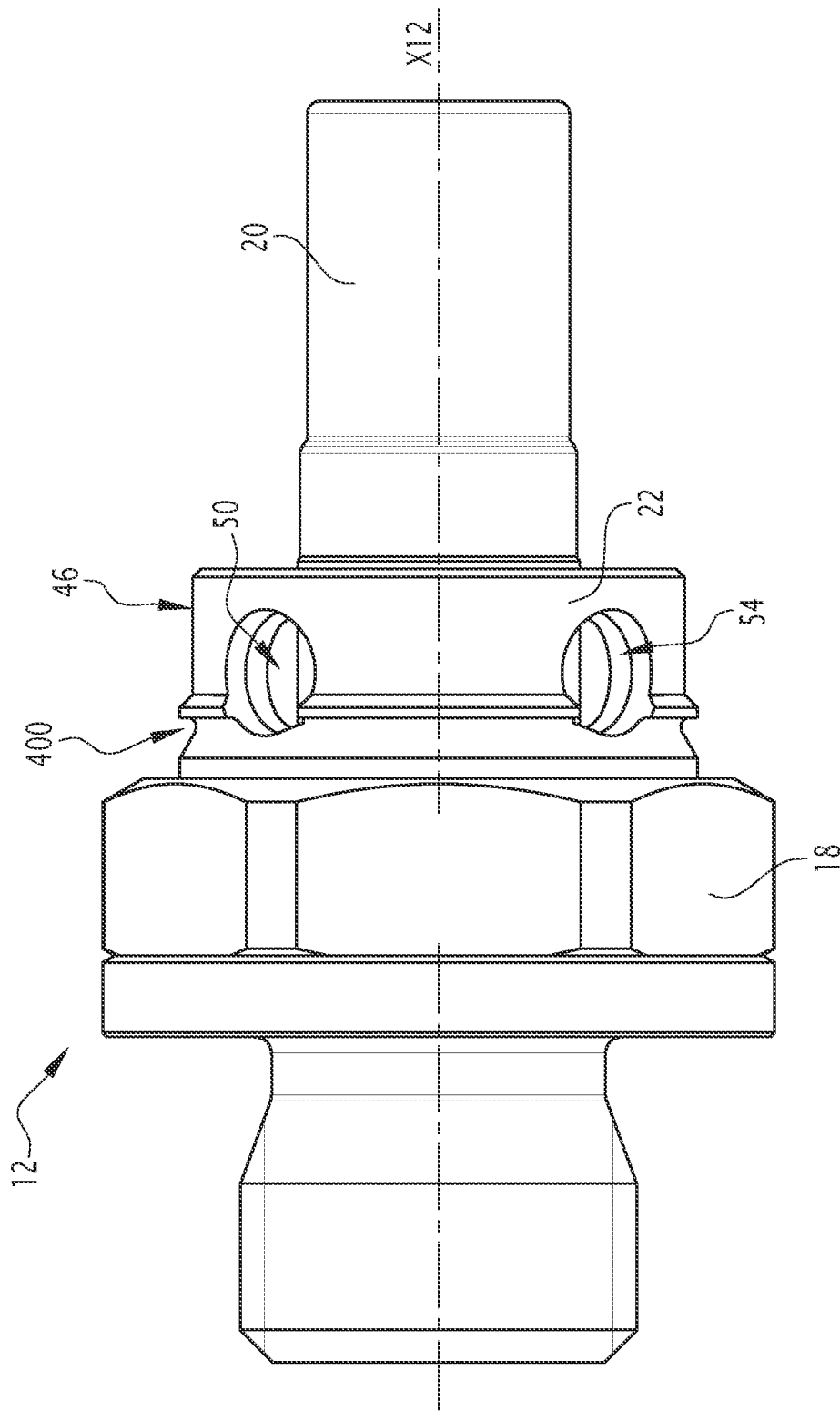
FIG. 17 is a side view of a portion of the male element of FIG. 16.
Figure 18:
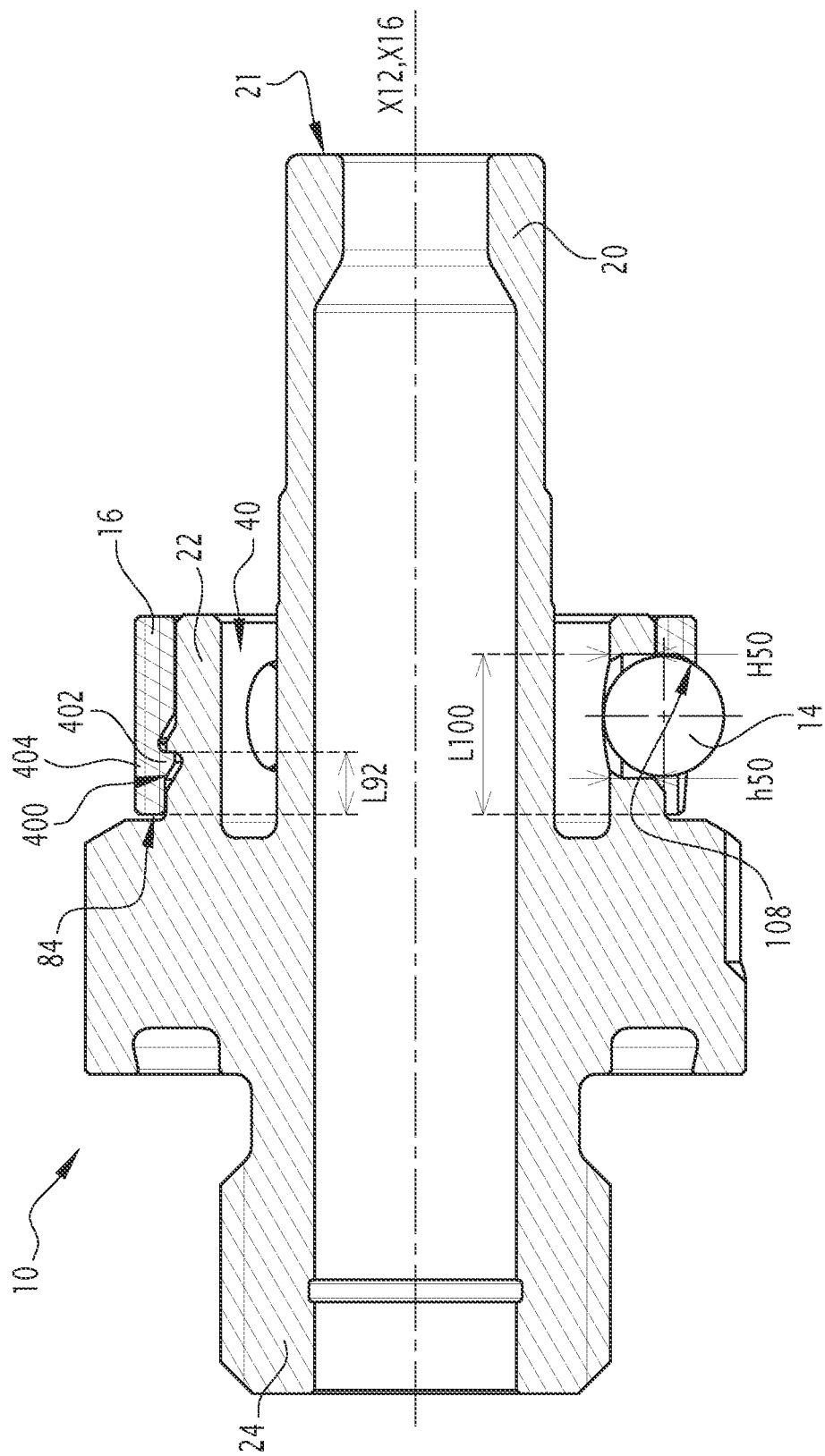
FIG. 18 is a cross-sectional view of the male element of FIG. 16.

The fourth embodiment of the invention is shown in FIGS. 16 to 18.

In FIGS. 16 to 18, the valve 28, spring 30, and stop ring 32 are not shown. In FIG. 17, the locking elements 14 and the ring 16 are not shown.

As in the first embodiment, the notches 100 of the fourth embodiment open onto the rear face 84 of the ring 16 and pass radially through the ring, and thus open onto the inner side 80 and onto the outer side 82 of the ring.

One of the main differences of the fourth embodiment from the first three embodiments is that the planar faces 104 of the inner wall 102 of a notch 100 diverge rearwardly, i.e., the planar faces 104 move away from each other from the curved face 106 to the rear face 84 of the ring 16.

The outer stop 108 of each notch 100 corresponds to the intersection between the curved face 106 and the outer face 82 of the ring 16, and the outer stop of each notch is thus formed by an angular sector of amplitude strictly less than 180°. In the example, the outer stop of each notch is formed by an angular sector of amplitude 120°. In particular, the angle formed between the two planar faces 104 is 60°.

Another difference of the fourth embodiment from the first three embodiments is that the outer face 46 of the crown 22 comprises an outer groove 400. The outer groove 400 is circumferential, i.e., it extends all around the crown 22, all around the axis X12, in a circumferential direction. In other words, along the longitudinal axis X12, the two circumferential ends of each outer groove 60 are arranged at the same level. Each tab 112 of the ring 16 comprises an inner tooth 402, complementary in shape to the outer groove 400, such that, when the ring 16 is mounted, the inner teeth 402 are clipped, or engaged, in the outer groove 400, as best seen in FIG. 18. The inner teeth 402 each delimit a front face 92.

The outer groove 400 is arranged, along the longitudinal axis X12, at the radial recesses 50, more precisely at the rear of the radial recesses. Thus, the distal radial height H50 of a radial recess 50 is greater than the proximal radial height h50 thereof.

In the fourth embodiment, as in the first embodiment, each tab 112 corresponds to an end portion of the ring, and in particular, to a proximal axial end portion. Each tab 112 is resiliently deformable. Moreover, the length L92 is less than half the length L100. The teeth 402 are thus formed at a rear free end 404 of the tabs, and thus the end portions of the ring. More specifically, the teeth 402 do not intersect with the rear face 84 of the ring 16 but each tooth 402 is arranged on a part 404 of the end portion of the ring which can move radially for mounting and possibly for dismounting the ring, due to the resilient deformation of the end portion.

In the fourth embodiment, the ring 16 is mounted on the male body 12 as in the first embodiment, by clipping the teeth 402 into the groove 400, during a translational movement of the ring along the longitudinal axes X12 and X16 from the front to the rear of the male body 12, with the tabs 112 which are resiliently deformed radially outward around the outer face 46 in the disengaged position and then are resiliently returned to the engaged position in the groove 400.

When the ring 16 is mounted, forward movement of the ring relative to the crown 22 is limited by a front axial face of the inner tooth 402 abutting an axial front face of the outer groove 400, and rearward movement of the ring relative to the crown is limited by the notches 100 abutting the associated locking elements 14, regardless of whether the locking elements are in the outer or inner position.

When the ring 16 is mounted, for each of the two opposite circumferential directions, the movement of the ring with respect to the crown 22 is limited by the notches 100 abutting the locking elements 14, independently of the radial position of the locking elements 14 in the radial recesses 50, the locking elements being themselves held in the radial recesses 50 by the outer stops 108 of the notches.

Preferably, in the fourth embodiment, the male element 10 comprises four locking elements 14 and as many radial recesses 50 and notches 100.

Figure 19:
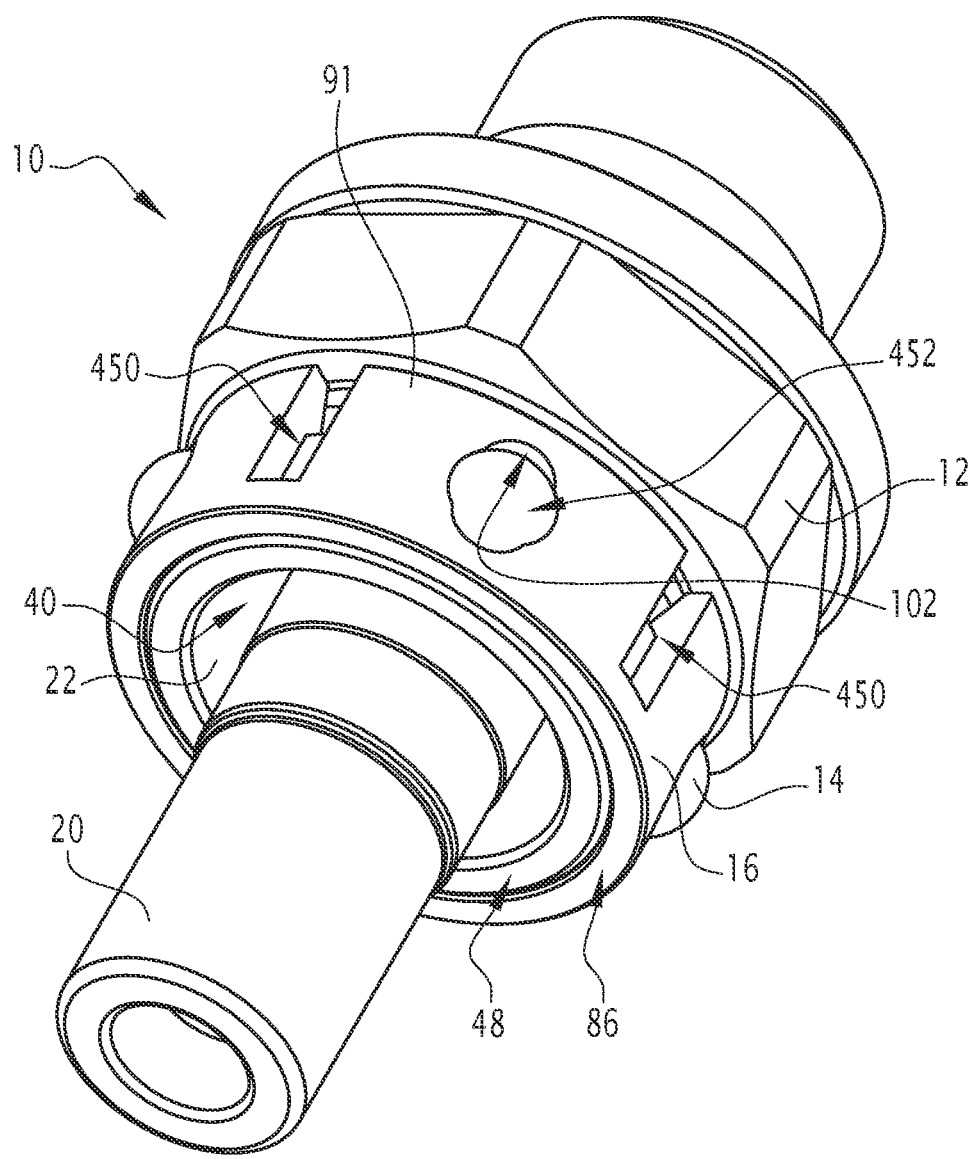
FIG. 19 is a perspective view of a male fluid connection element according to a fifth embodiment of the invention.
Figure 20:
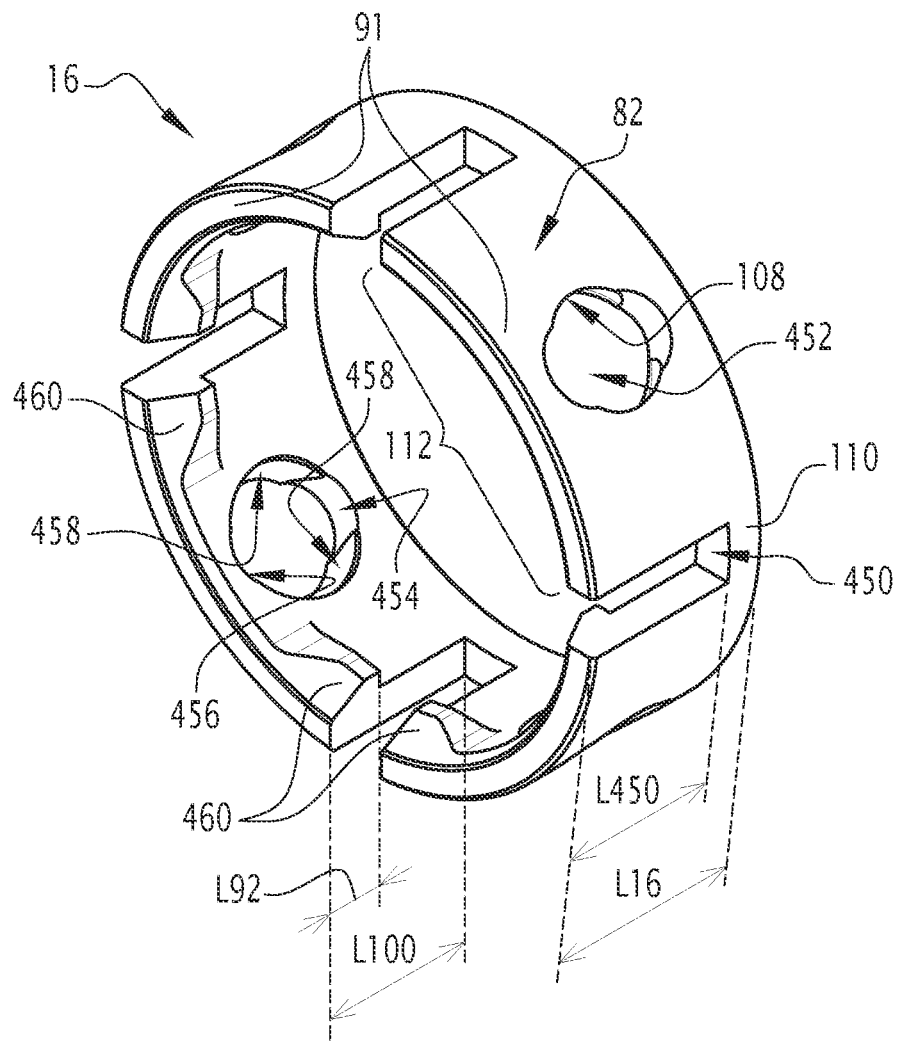
FIG. 20 is a perspective view of a portion of the male element of FIG. 19.
Figure 21:
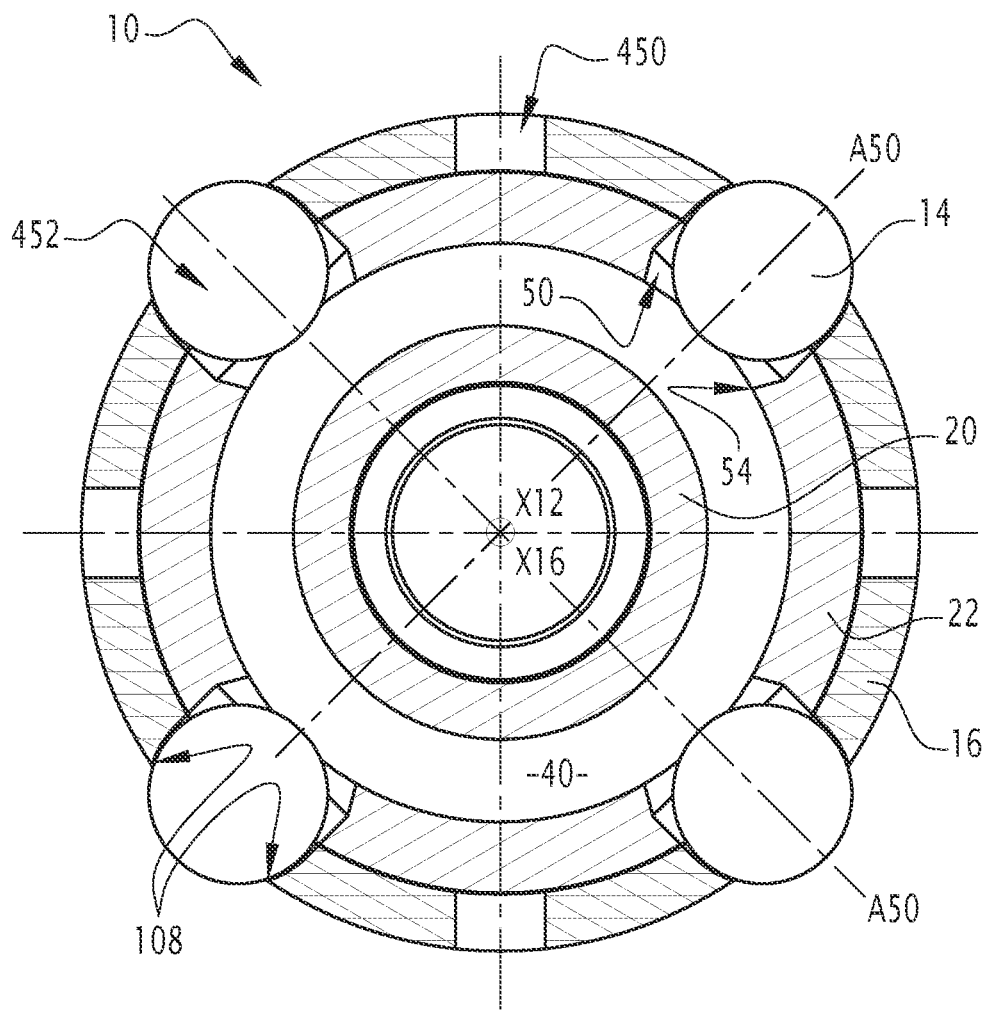
FIG. 21 is a cross section of the male element of FIG. 19.

The fifth embodiment of the invention is shown in FIGS. 19 to 21.

In FIGS. 19 to 21, the valve 28, spring 30, and stop ring 32 are not shown.

One of the main differences of the fifth embodiment from the first four embodiments is that the ring 16 comprises longitudinal slots 450 and longitudinal notches 452 that are distinct from the longitudinal slots. When the ring 16 is mounted, the longitudinal notches are located opposite the radial recesses 50 of the crown 22 in a radial direction.

Thus, the longitudinal slots 450 circumferentially delimit the tabs 112 and allow for the resilient deformation of the tabs necessary for mounting the ring on the crown 22.

Each longitudinal slot 450 extends from the front face 86 of the ring 16 to the annular distal portion 110 of the ring. Preferably, the longitudinal slots 450 extend over a length L450 between 50% and 80% of the length L16 of the ring 16.

Each notch 452 is comprised by a tab 112. Thus, each notch 452 is arranged, in a circumferential direction, between two adjacent longitudinal slots 450.

In the example, the longitudinal notches 452 and the longitudinal slots 450 are evenly distributed in a circumferential direction about the axis X12, and are angularly offset by 45° about the axis X12.

The notches 452 comprise a front face 454, a rear face 456, and two side faces 458, which form the inner wall 102 of the notches.

The outer stop 108 of a notch 452 is formed at the intersection of the two lateral faces 458 of said notch with the outer face 82 of the ring 16. The outer stops are thus distributed around the radial central axes A50 of the radial recesses 50. In particular, the two lateral faces 458 of a notch form two outer stop areas in the form of angular sectors, each of which has, in the example, an angular amplitude of 80° about the radial central axis A50 of the radial recess associated with said notch.

For each notch 452, the outer stop 108 and the inner wall 102 are in line with each other, and form a concave surface in a portion of a sphere.

Each tab 112 of the ring 16 further comprises two inner teeth 460, arranged at the rear free end 91 of the tab and at both ends of the tab, in a circumferential direction. Thus, the inner teeth 460 of a tab 112 are arranged on either side of the longitudinal notch 452 of said tab about the axis X16.

Similar to the first embodiment, the inner teeth 460 clip into planar and orthoradial outer grooves 60 of the crown 22. In particular, as in the first embodiment, said outer grooves 60 are angularly offset from the radial recesses 50 about the axis X12. Thus, two inner teeth 460 arranged on each circumferential side of a longitudinal slot 450, thus formed on two adjacent tabs 112, are engaged in the same outer groove 60.

In the fifth embodiment, as in the first embodiment, the tabs 112 correspond to end portions of the ring, and in particular, to proximal axial end portions. Said tabs 112 are resiliently deformable. In addition, inner teeth 460 are formed at the rear free ends 91 of the tabs, and thus end portions of the ring. More specifically, the teeth 460 form an inner end of the end portion of the ring.

As in the first embodiment, the longitudinal retention of the ring 16 with respect to the male body 12 and of the inner teeth 460 in the outer groove 60 thereof is achieved forwardly by the inner teeth 460 of the tabs 112 of the ring 16 abutting the outer grooves 60 of the crown 22, and rearwardly by the outer abutments 108 of the notches 452 of the ring abutting the locking elements 14.

Similar to the first embodiment, in the circumferential directions, the retention of the ring 16 with respect to the male body 12 and the inner teeth 460 in their outer groove 60 is achieved by the inner teeth 460 abutting the outer grooves 60 of the crown 22.

In one variant (not shown) of the invention, the radial recesses 50 of the crown 22 are not delimited by an inner stop 54 formed on the crown 22, inwardly. In such a variant, the radial thickness of the annular space 40, denoted "E40," is less than half the radial dimension of the locking elements 14, in order to prevent jamming of the locking elements in the annular space when the male element 10 is coupled to the female element 200. In particular, when the locking elements are locking balls, the radial thickness E40 is less than half the diameter D14. The radially inward movement of each locking element 14 in the associated radial recess 50 is then prevented by an inner stop formed by the radial outer face 42 of the male body 12.

In one variant (not shown) of the invention, a single end portion comprises one or more inner teeth for securing the ring 16 to the male body 12.

In one variant (not shown) of the invention, the outer stop 108 is not evenly distributed about the radial central axis A50 of the radial recess 50.

In one variant (not shown), the front face 64 of the outer groove 60 is planar and inclined by +/−10° with respect to a plane perpendicular to the longitudinal axis X12. The geometry of the front face 92 of the inner tooth is then complementary to advantageously allow the front face 92 to abut the front face 64 in a planar manner along the forward longitudinal direction X.

In all embodiments, the notch is recessed in the ring, i.e., an annular surface, i.e., extending all around the axis X16 in the circumferential direction, cannot delimit a notch within the context of the invention.

In all embodiments, the one or more end portions of the ring are delimited by the rear face of the ring, a first longitudinal slot, and by one of either the front face of the ring and a second longitudinal slot adjacent to the first longitudinal slot.

Any feature described for one embodiment or variant in the above may be implemented for the other embodiments and variants described above, provided that it is technically feasible.

The invention claimed is:

1. A male fluid connection element comprising:
a male body, centered on a longitudinal axis, defining a forward longitudinal direction and comprising:

a tubular extension centered on the longitudinal axis, delimiting an inner conduit and having an outer radial face, and a crown arranged in a fixed manner around the tubular extension and having at least one radial recess, each radial recess opening onto an inner face and onto an outer face of the crown, the inner face of the crown and the outer radial face of the tubular extension radially delimiting an annular space between them;

an integral ring which is mounted around the crown;

for each radial recess, a locking element of which radially outward movement into the associated radial recess is limited by an outer stop formed by the ring at a junction between a notch of the ring and an outer face of the ring, each locking element being movable in the radial recess thereof between:

an inner position, in which the locking element projects from the inner face and outer face of the crown and does not project from the outer face of the ring, and in which movement of each locking element radially inwardly into the associated radial recess is prevented by an inner stop formed by the male body, and an outer position, in which the locking element projects from the outer face of the ring, wherein, when the ring is mounted on the crown, the male body faces a rear face of the ring in the forward longitudinal direction, and the ring faces the male body or at least one locking element in the forward longitudinal direction, at least when said locking element is in the inner position, wherein:

each radial recess is delimited by an inner wall forming part of the crown, the inner wall extending around a radial central axis of the radial recess;

the ring has at least one longitudinal slot which passes radially through the ring and opens onto the rear face of the ring;

the ring comprises a resiliently deformable end portion delimited by the longitudinal slot and the rear face of the ring; and a free end of the end portion comprises at least one inner tooth which, when the ring is mounted on the crown, is engaged in an outer groove, provided in the outer face of the crown.

2. The male fluid connection element according to claim 1, wherein the end portion of the ring is able to resiliently deform radially to the longitudinal axis, to allow movement of the inner tooth between a position disengaged from the outer groove and the position engaged in the outer groove.

3. The male fluid connection element according to claim 1, wherein, when the ring is mounted on the crown, in each of the two directions circumferential to the longitudinal axis, the ring is able to abut a transverse face of the crown, in particular a planar and orthoradial transverse bottom face of the outer groove.

4. The male fluid connection element according to claim 1, wherein, when the ring is mounted on the crown, the inner tooth is able to abut a front face of the outer groove in the forward longitudinal direction.

5. The male fluid connection element according to claim 4, wherein the ring comprises an annular distal portion forming a front end of the ring, wherein each end portion of the ring extends from the annular distal portion and is circumferentially delimited by two adjacent longitudinal slots, and wherein the free end forming each inner tooth is a rear free end of the end portion.

6. The male fluid connection element according to claim 4, wherein the front face of the outer groove is arranged, along the longitudinal axis, at the same level as each radial recess.

7. The male fluid connection element according to claim 4, wherein a rear face of each inner tooth intersects the rear face of the ring and converges toward the longitudinal axis in the forward longitudinal direction and wherein the front face of each outer groove extends perpendicular to the longitudinal axis.

8. The male fluid connection element according to claim 1, wherein each longitudinal slot of the ring forms a notch with an outer stop.

9. The male fluid connection element according to claim 1, wherein the outer groove is angularly offset from each radial recess of the crown, around the longitudinal axis.

10. The male fluid connection element according to claim 1, wherein the inner wall of each radial recess intersects, along the entire contour thereof, with a surface of constant diameter forming the outer face of the crown.

11. The male fluid connection element according to claim 1, wherein, for each locking element, the outer stop is distributed around the radial central axis of the radial recess associated with said locking element.

12. The male fluid connection element according to claim 1, wherein the locking element is a locking ball, and wherein a radial thickness between the outer face of the crown and the outer face of the ring, measured at the level of the radial recess, is strictly less than a radius of the locking ball.

13. The male fluid connection element according to claim 1, wherein a portion of the male body delimits a front face which is arranged opposite, in the forward longitudinal direction, the rear face of the ring and which extends beyond the crown outwardly in a direction radial to the longitudinal axis, and wherein the portion of the male body is integral with the tubular extension and with the crown.

14. The male fluid connection element according to claim 1, wherein the ring is made of a polymeric plastics material.

15. A fluid connection, comprising a male element and a female element, the female element comprising a female body having an outer annular groove therein, and a locking sleeve which has a locking face and which is movable relative to the female body along a longitudinal axis of the female body, between a locked position, in which the locking face is radially aligned with the outer annular groove, and an unlocked position, in which the locking face is offset from the outer annular groove along the longitudinal axis of the female body, wherein the male element is the male fluid connection element according to claim 1, wherein, when the locking sleeve is in the unlocked position, each locking element is free to move to an outer position within the radial recess, and wherein, when the male element is coupled with the female element, the locking sleeve is in the locked position, surrounds the ring, and radially overlaps the notch to hold the locking element in the outer annular groove of the female body, with the female body being engaged within the annular space.

* * * * *